United States Patent
Cogliandro et al.

(10) Patent No.: US 11,700,448 B1
(45) Date of Patent: Jul. 11, 2023

(54) COMPUTER/HUMAN GENERATION, VALIDATION AND USE OF A GROUND TRUTH MAP TO ENFORCE DATA CAPTURE AND TRANSMISSION COMPLIANCE IN REAL AND NEAR REAL TIME VIDEO OF A LOCAL SCENE

(71) Applicant: Raytheon Company, Waltham, MA (US)

(72) Inventors: John A. Cogliandro, Dedham, MA (US); Matthew J. Tacy, Boston, MA (US); Allan Mayorga, Salem, MA (US); Richard M. Pinti, Needham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/733,456

(22) Filed: Apr. 29, 2022

(51) Int. Cl.
| | |
|---|---|
| H04N 23/60 | (2023.01) |
| G06V 10/764 | (2022.01) |
| G06V 20/40 | (2022.01) |
| H04N 23/61 | (2023.01) |
| H04N 23/62 | (2023.01) |

(52) U.S. Cl.
CPC .......... H04N 23/64 (2023.01); G06V 10/764 (2022.01); G06V 20/41 (2022.01); H04N 23/61 (2023.01); H04N 23/62 (2023.01)

(58) Field of Classification Search
CPC ........ H04N 23/64; H04N 23/61; H04N 23/62; G06V 10/764; G06V 20/41
See application file for complete search history.

(56) References Cited

U.S. PATENT DOCUMENTS

| | | | |
|---|---|---|---|
| 4,992,883 | A | 2/1991 | Tsunekawa |
| 5,594,469 | A | 1/1997 | Freeman et al. |
| 6,356,437 | B1 | 3/2002 | Mitchell et al. |
| 6,970,183 | B1 | 11/2005 | Monroe |
| 7,110,909 | B2 | 9/2006 | Friedrich et al. |
| 7,126,558 | B1 | 10/2006 | Dempski |

(Continued)

FOREIGN PATENT DOCUMENTS

| | | |
|---|---|---|
| CN | 106228544 A | 12/2016 |
| JP | 2000092473 A | 3/2000 |

(Continued)

OTHER PUBLICATIONS

"International Application Serial No. PCT/US2022/047126, Invitation to Pay Additional Fees dated Feb. 1, 2023", 12 pgs.

(Continued)

*Primary Examiner* — Ahmed A Berhan
(74) *Attorney, Agent, or Firm* — Schwegman Lundberg & Woessner, P.A.

(57) ABSTRACT

A hybrid computer/human method for generating, validating and using a ground truth map (GTM) provides for enforcement of data capture and transmission compliance of real and near real time video. Computer-implemented processes are used to identify and classify as allowed or disallowed objects in a local scene based on attributes of a video session. A human interface is available to validate either the object identification or classification. The GTM is then used, preferably in conjunction with motion sense, to enforce data capture and transmission compliance of real and near real time video within the local scene.

23 Claims, 16 Drawing Sheets

(56) References Cited

U.S. PATENT DOCUMENTS

| | | | |
|---|---|---|---|
| 7,372,451 | B2 | 5/2008 | Dempski |
| 7,596,240 | B2 * | 9/2009 | Ito .................. G08B 13/19604 |
| | | | 382/152 |
| 7,653,259 | B2 * | 1/2010 | Pilu ........................ H04N 23/61 |
| | | | 382/117 |
| 8,432,559 | B2 | 4/2013 | Kobayashi |
| 8,749,343 | B2 | 6/2014 | Cirker |
| 9,179,105 | B1 | 11/2015 | Zeira et al. |
| 9,582,709 | B2 | 2/2017 | Wang et al. |
| 10,089,790 | B2 | 10/2018 | Lawson et al. |
| 10,122,825 | B1 | 11/2018 | Petty |
| 10,142,410 | B2 | 11/2018 | Giffin et al. |
| 10,403,046 | B2 | 9/2019 | Pinti et al. |
| 10,425,403 | B2 | 9/2019 | Chen et al. |
| 10,440,348 | B2 | 10/2019 | Koppal et al. |
| 10,531,137 | B1 | 1/2020 | Matak et al. |
| 10,602,054 | B2 | 3/2020 | Jung et al. |
| 10,674,972 | B1 | 6/2020 | Piatrou et al. |
| 10,679,425 | B2 | 6/2020 | Pinti et al. |
| 10,878,584 | B2 | 12/2020 | Agata et al. |
| 2005/0018879 | A1 | 1/2005 | Ito et al. |
| 2008/0030575 | A1 | 2/2008 | Davies et al. |
| 2010/0002071 | A1 | 1/2010 | Ahiska |
| 2011/0130949 | A1 | 6/2011 | Arrasvuori |
| 2011/0142369 | A1 | 6/2011 | Aila et al. |
| 2012/0074296 | A1 | 3/2012 | Hammes et al. |
| 2012/0087546 | A1 | 4/2012 | Focke et al. |
| 2012/0203487 | A1 | 8/2012 | Johnson et al. |
| 2013/0278778 | A1 | 10/2013 | Kagei |
| 2014/0168084 | A1 | 6/2014 | Burr |
| 2014/0210856 | A1 | 7/2014 | Finn et al. |
| 2015/0186728 | A1 | 7/2015 | Kimura |
| 2015/0302647 | A1 | 10/2015 | Osterhout et al. |
| 2016/0026253 | A1 | 1/2016 | Bradski et al. |
| 2016/0080642 | A1 | 3/2016 | Jung et al. |
| 2016/0080652 | A1 | 3/2016 | Shirota et al. |
| 2016/0133054 | A1 | 5/2016 | Honjo et al. |
| 2016/0335524 | A1 | 11/2016 | Bremer et al. |
| 2016/0349228 | A1 | 12/2016 | Kester et al. |
| 2016/0378939 | A1 | 12/2016 | Baumberger et al. |
| 2017/0193279 | A1 | 7/2017 | Kusens et al. |
| 2017/0273549 | A1 | 9/2017 | Nazareth et al. |
| 2017/0323062 | A1 | 11/2017 | Djajadiningrat et al. |
| 2017/0339295 | A1 | 11/2017 | Honda |
| 2018/0092698 | A1 | 4/2018 | Chopra et al. |
| 2018/0259673 | A1 | 9/2018 | Cui et al. |
| 2018/0309808 | A1 | 10/2018 | Andon et al. |
| 2018/0330096 | A1 | 11/2018 | Breindel et al. |
| 2018/0330110 | A1 | 11/2018 | Nelson et al. |
| 2018/0336737 | A1 | 11/2018 | Varady et al. |
| 2018/0341812 | A1 | 11/2018 | Floor et al. |
| 2019/0066403 | A1 | 2/2019 | Nagura et al. |
| 2019/0088026 | A1 | 3/2019 | Isaacson et al. |
| 2019/0122378 | A1 | 4/2019 | Aswin |
| 2019/0122437 | A1 | 4/2019 | Pinti et al. |
| 2019/0188930 | A1 | 6/2019 | Tsukahara |
| 2019/0335115 | A1 | 10/2019 | Kumai |
| 2020/0082631 | A1 | 3/2020 | Yoon et al. |
| 2020/0143643 | A1 | 5/2020 | Kusens et al. |
| 2020/0174261 | A1 | 6/2020 | Uenohara et al. |
| 2020/0210726 | A1 | 7/2020 | Yang et al. |
| 2020/0334919 | A1 | 10/2020 | Bowen |
| 2020/0394430 | A1 | 12/2020 | Ahmed et al. |
| 2021/0070311 | A1 | 3/2021 | Patychuk et al. |
| 2021/0224885 | A1 | 7/2021 | Yarra et al. |

FOREIGN PATENT DOCUMENTS

| | | | |
|---|---|---|---|
| JP | 2000228741 | A | 8/2000 |
| JP | 2006025250 | A | 1/2006 |
| JP | 2006293605 | A | 10/2006 |
| JP | 2011097238 | A | 5/2011 |
| JP | 2015126352 | A | 7/2015 |
| JP | 2016167688 | A | 9/2016 |
| JP | 2017108263 | A | 6/2017 |
| JP | 2017529635 | A | 10/2017 |
| JP | 2021118499 | A | 8/2021 |
| WO | WO-2010094065 | A1 | 8/2010 |
| WO | WO-2015170409 | A1 | 11/2015 |
| WO | WO-2017027338 | A1 | 2/2017 |
| WO | WO-2017177019 | A1 | 10/2017 |
| WO | WO-2017204081 | A1 | 11/2017 |

OTHER PUBLICATIONS

"International Application Serial No. PCT/US2022/047144, Invitation to Pay Additional Fees dated Jan. 31, 2023", 15 pgs.

Vollmer, Michael, et al., "High speed and slow motion: the technology of modern high speed cameras", Physics Education, Institute of Physics Publishing, Bristol, GB, vol. 46, No. 2, (Mar. 3, 2011), 191-202.

"Canadian Application Serial No. 3076505, Voluntary Amendment filed Apr. 28, 2020", 11 pgs.

"European Application Serial No. 18789290.6, Communication Pursuant to Article 94(3) EPC dated Jan. 20, 2021", 7 pgs.

"European Application Serial No. 18789290.6, Response filed May 7, 2021 to Communication Pursuant to Article 94(3) EPC dated Jan. 20, 2021", 21 pgs.

"European Application Serial No. 21188467.1, Extended European Search Report dated Nov. 2, 2021", 9 pgs.

"European Application Serial No. 21188467.1, Response filed Jan. 7, 2022 to Extended European Search Report dated Nov. 2, 2021", 16 pgs.

"International Application Serial No. PCT/US2018/052626, Written Opinion dated Dec. 7, 2018", 9 pgs.

"International Application Serial No. PCT/US2018/052626, International Preliminary Report on Patentability dated Apr. 21, 2020", 10 pgs.

"International Application Serial No. PCT/US2018/052626, International Search Report dated Dec. 7, 2018", 4 pgs.

"Korean Application Serial No. 10-2020-7007808, Notice of Preliminary Rejection dated Nov. 30, 2021", w/ English translation, 5 pgs.

"Korean Application Serial No. 10-2020-7007808, Response filed Jan. 25, 2022 to Notice of Preliminary Rejection dated Nov. 30, 2021", with machine translation, 24 pgs.

"Korean Application Serial No. 10-2020-7007808, Voluntary Amendment filed May 21, 2020", with English translation of claims, 29 pgs.

"XMReality 4.4 Manual, XMReality Remote Guidance, "Like Being There" XMReality AB, 2015.", (2015), 49 pages.

Henderson, Steven, et al., "Augmented Reality for Maintenance and Repair (ARMAR)", Air Force Research Laboratory Human Effectiveness Directorate Warfighter Readiness Research Division Logistics Readiness Branch Wright-Patterson AFB OH 45433-7604, (Aug. 2007), 70 pages.

Henderson, Steven, et al., "Evaluating the Benefits of Augmented Reality for Task Localization in Maintenance of an Armored Personnel Carrier Turret", IEEE International Symposium on Mixed and Augmented Reality 2009 Science and Technology Proceedings, (Oct. 19-22, 2009), 10 pages.

Molineros, Jose, et al., "Computer vision for guiding manual assembly", Proceedings of the 2001 IEEE International Symposium on Assembly and Task Planning, (May 29-29, 2001), 7 pages.

Reiners, Dirk, et al., "Augmented Reality for Construction Tasks: Doorlock Assembly", http://www.igd.fhg.de/www/igd-a4/, (Nov. 1998), 10 pages.

Smith, Randall, et al., "Estimating Uncertain Spatial Relationships in Robotics", Machine Intelligence and Pattern Recognition 1, (Jan. 1986), 435-461.

Tang, Arthur, et al., "Comparative Effectiveness of Augmented Reality in Object Assembly", Paper: New Techniques for Presenting Instructions and Transcripts CHI 2003: New Horizons, (Apr. 5-10, 2003), 8 pages.

"U.S. Appl. No. 17/507,073, Notice of Allowance dated Dec. 22, 2022", 10 pgs.

(56) References Cited

OTHER PUBLICATIONS

"U.S. Appl. No. 17/507,073, Supplemental Notice of Allowability dated Jan. 5, 2023", 2 pgs.
"U.S. Appl. No. 17/507,111, Non Final Office Action dated Nov. 25, 2022", 20 pgs.
"U.S. Appl. No. 17/507,111, Response filed Jan. 23, 2023 to Non Final Office Action dated Nov. 25, 2022", 16 pgs.
"Canadian Application Serial No. 3076505, Office Action dated Dec. 16, 2022", 5 pgs.
"Canadian Application Serial No. 3076505, Response Filed Dec. 20, 2022 to Office Action dated Dec. 16, 2022", 7 pgs.
"Canadian Application Serial No. 3076505, Voluntary Amendment Filed Dec. 21, 2022", 12 pgs.
"Japanese Application Serial No. 2021-112687, Response filed Oct. 31, 2022 to Notification of Reasons for Refusal dated Aug. 2, 2022", with English translation of claims, 10 pgs.
"Kuwait Application Serial No. KW/P/2020/138, Office Action dated Dec. 27, 2022", 5 pgs.
"Japanese Application Serial No. 2021-112687, Notification of Reasons for Refusal dated Aug. 2, 2022", w/ English Translation, 6 pgs.

\* cited by examiner

LOCAL ENVIRONMENT — 314

| COUNTRY | USA (AUTO DETECT) ⌄ |
| AREA | SITE A1B ⌄ |
| ENVIRONMENT | A1B-409 ⌄ |
| USER | SELECT ⌄ <br> CHEN, OP1 <br> SMITH, OP1 <br> RYAN, OP2 <br> WEST, SME1 |

DESTINATION ENVIRONMENT

| COUNTRY | CAN (AUTO DETECT) ⌄ |
| AREA | CONFIRM 2-301 ⌄ |

SESSION DETAILS

| TASK | TASK 4 - DISASSEMBLY ⌄ |
| SECURITY LEVEL | AUTO (DEFAULT) ⌄ |
| TASK | TASK 4 - DISASSEMBLY ⌄ |
| OTHER PERSONNEL | SELECT ⌄ <br> CONTRACTOR <br> SUPPLIER <br> EXECUTIVE TEAM <br> FOREIGN |

TYPE ADDITIONAL COMMENTS IN THIS BOX

| INITIAL GTM | CONFIRM ID | ATTRIBUTES | NEW GTM | REVIEW |

COMPUTER/HUMAN GENERATION, VALIDATION AND USE OF A GROUND TRUTH MAP TO ENFORCE DATA CAPTURE AND TRANSMISSION COMPLIANCE IN REAL AND NEAR REAL TIME VIDEO OF A LOCAL SCENE

BACKGROUND OF THE INVENTION

Field of the Invention

This invention relates to the capture and processing of video to enforce data capture and transmission compliance in real or near real-time private, restrictive or secure environments.

Description of the Related Art

Video camera technology is increasingly ubiquitous in the world today. Devices such as head-mounted cameras, robotically controlled cameras, semi-autonomous or autonomous robots, cellular telephones, desktop or table computers, near-eye displays and hand-held game systems, for example, may include cameras and associated software to enable video capture, display and transmission. These devices are being used to provide unidirectional or bi-directional video communication in real or near real time. Privacy and security concerns exists when, intentionally or unintentionally, video that should not be captured, stored, displayed or transmitted is. These privacy and security issues are sometimes called "data spills". A person's, company's or country's privacy may be violated, possibly illegally. In certain restrictive, such as military or company proprietary or secure environments, strict controls exist governing what visual information may be captured, stored, displayed or transmitted (particularly across country boundaries).

In an effort to restrict unwanted video capture or transmission, some existing systems monitor the video as it is captured. These systems use human processing, computer vision (CV), artificial intelligence (AI), computational algorithms, or a combination thereof to identify problematic visual information (e.g. a person's face or a company's proprietary information) and then either removes or obscures the information from the video file data. These systems may even shut off the recording device to prevent further capture of problematic information. However, the existing systems described all capture, store, and process the problematic information. Because the problematic data is stored (albeit sometimes only temporarily) and processed, data spill risks, such as those related to cyber incursions or theft, still exist, and therefore these systems cannot meet requirements for certain secure or restrictive environments. The processing required to remove or obscure the information from the video file makes these systems incompatible with applications that require real or near real time video capture and transmission.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems, or medical procedures. In these applications, it may be necessary to capture and uni-directionally or bi-directionally transmit video of a local scene that includes problematic information in real or near real time to facilitate efficient and effective remote communication. As a special case, data capture and transmission compliance may be implemented in an Augmented Reality environment.

Augmented Reality (AR) refers to the generation of two or three dimensional (3D) video graphics or other media such that they are overlaid on and registered with surrounding objects in the environment. Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user.

In certain video or AR environments such as a remote repair or inspection, a concern, primarily of the customer and which is heightened by the video camera industry push to maximize the FOV, is that the user of the video being captured and transmitted or viewed locally (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal, mechanically narrowing the FOV, or sequestering the video prior to transmission and having a security-cleared domain expert review and edit the video signal post-capture. These are often impractical and time consuming activities. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent any type of post-capture editing for national security and ITAR—International Traffic and Arms Regulations reasons.

U.S. Pat. Nos. 10,403,046 and 10,679,425 entitled "Field of View (FOV) and Key Code Limited Augmented Reality to Enforce Data Capture and Transmission Compliance" disclosed enforcement of an alignment condition between the video camera's pointing direction and a marker in the scene to avoid capture of excluded data in a real-time interactive situation. This may be done, for example, by determining whether the video camera pointing direction satisfies an alignment condition to a marker in the local scene such that the video camera FOV lies within a user-defined allowable FOV about the marker. A separate sensor may be used to detect the presence of the marker within a sensor FOV to satisfy the alignment condition. The camera or sensor FOV may be reduced to create a buffer zone to provide additional assurance that the camera FOV does not stray outside the allowable FOV. If the alignment condition is not satisfied, the video camera is controlled to exclude at least a portion of the camera FOV that lies outside a user-defined allowable FOV from capture within the video signal. For example, this could be done by turning the video camera off or by narrowing its FOV. Markers may also be used as a fail safe to ensure imagery in a particularly sensitive area of the scene is neither captured nor transmitted. If the separate sensor detects these markers, the video camera is shut down. The system may cue the user e.g., "green" means the alignment condition is satisfied, "yellow" means the technician's eyes or camera are beginning to wander and "red" means the alignment condition is violated and the camera is disabled. In this system, the use of a separate sensor to enforce the alignement condition and to detect other markers in sensitive areas is specifically designed for more rigorous environments, in which compliance requires that portions of the scene or tagged objects cannot be captured (detected) by the video camera itself, much less output into the video signal and for environments in which real or quasi real-time interaction is required.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a hybrid computer/human method for generating, validating and using a ground truth map (GTM) to provide for enforcement of data capture and transmission compliance of real and near real time video. Computer-implemented processes are used to identify and classify as allowed or disallowed objects in a local scene based on attributes of a video session. A human interface is available to validate either the object identification or classification. The GTM is then used to enforce data capture and transmission compliance of video within the local scene.

In an embodiment, the method comprises providing a library of objects in which each object is characterized by one or more attributes that determine whether an object is allowed or disallowed. A GTM of the local scene is generated of the local scene including one or more identified objects. The objects may be linked to models having defined attributes in the library. An interactive human interface is used to specify one or more attributes including but not limited to object, task, environment, humans in the loop, transmission channel or security level. A computer-implemented process compares identified objects to the library and uses the specified attributes to classify the objects in the GTM as disallowed or allowed. The interactive human interface displays the GTM and indicia of allowed and disallowed objects and preferably prompts the user to confirm or override the object identifications or classifications to output a final GTM. The user's ability to override object classifications may be limited by the user's (or a supervisor's) authorization level. Any override and reasons for the override by may be stored in a historical record or used to modify attributes in the library or the computer-implemented classification process. In certain configurations, the user (or supervisor) may be able to adjust or "throttle" the classification thresholds for object identification or classification.

The method transitions to a video capture and transmission mode, in which a video camera captures a sequence of images within a camera field-of-view (CFOV) in the local scene to form the video signal. Prior to forming the video signal, the final GTM is used to determine whether the CFOV will include disallowed or allowed objects. If a disallowed object will be included in the CFOV, the video camera is controlled (e.g., turned off, CFOV narrowed or selected pixels blurred in real-time) to prevent inclusion of the disallowed object in the video signal. If no disallowed objects will be included in the CFOV, the video signal is formed and transmitted.

In an embodiment, an initial GTM is generated in an object identification mode using a camera (same or different camera than the video camera) to create an image of the local scene, using a computer-implemented process to identify the objects and using the interactive human interface to confirm or override the object identifications. The initial GTM is then available for any specific video session in which the objects are classified as allowed or disallowed based on the attributes of that session.

In a different embodiment, the interface is used to specify the attributes of a specific video session and then, as the camera is used to create the image of the local scene, computer-implemented processes first identify and then classify the objects as allowed or disallowed. The interactive human interface is then used to confirm or override both the object identifications and classifications.

In an embodiment, to use the final GTM in the video capture and transmission mode, a pose (location and orientation) of the video camera is determined and used to extract a map FOV from the final GTM. The process determines whether the map FOV includes disallowed or allowed objects. In an alignment condition embodiment, the map FOV is used to determine whether the video camera pointing direction satisfies an alignment condition to a specified allowed object. In a time delay embodiment, the images are time-delayed prior to forming the video signal to provide time to recognize disallowed objects in the map FOV. In a predicted FOV embodiment, motion of the camera is used to compute predicted map FOV to recognize disallowed objects. In addition, in the alignment condition and time-delay embodiments, object recognition may be applied to the imagery in the camera FOV and compared to the identified objects in the map FOV to validate that the same object is seen. In addition, the GTM can used to determine if a violation of the alignment condition or capturing a disallowed object is imminent and issue a cue to the user to take corrective action to avoid or mitigate the violation.

In an embodiment, a motion sensor is configured to sense the motion of any object before the object enters the video camera's CFOV. The moving object might be an identified and classified object in the final GTM or an unidentified object that has moved into the local scene. The method treats any moving object as a disallowed and controls the video camera to prevent inclusion of the moving object in the video signal. In an embodiment, the video capture and transmission mode may be temporarily suspended until the computer-implemented process can identify and classify the object and the interactive human interface used to confirm or override the identification or classification before returning to the video capture and transmission mode.

In another embodiment, the method comprises providing a library of objects in which each object is characterized by one or more attributes that determine whether an object is allowed or disallowed. A GTM of the local scene is generated including one or more identified objects. A computer-implemented process compares identified objects to the library of objects and uses attributes specified for a session to classify the objects in a final GTM as disallowed or allowed. Foregoing the final user validation of the object classifications may be suitable when the application or particular video session makes such user validation impracticable (e.g., time does not allow). Alternately, if the application has matured to a point that the attributes and computer identification and classification algorithms are well established and very accurate, the final user validation may not be required.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5A-5E are screen shots of an embodiment of an interactive human interface for generating and validating a GTM;

DETAILED DESCRIPTION OF THE INVENTION

Figure 1:
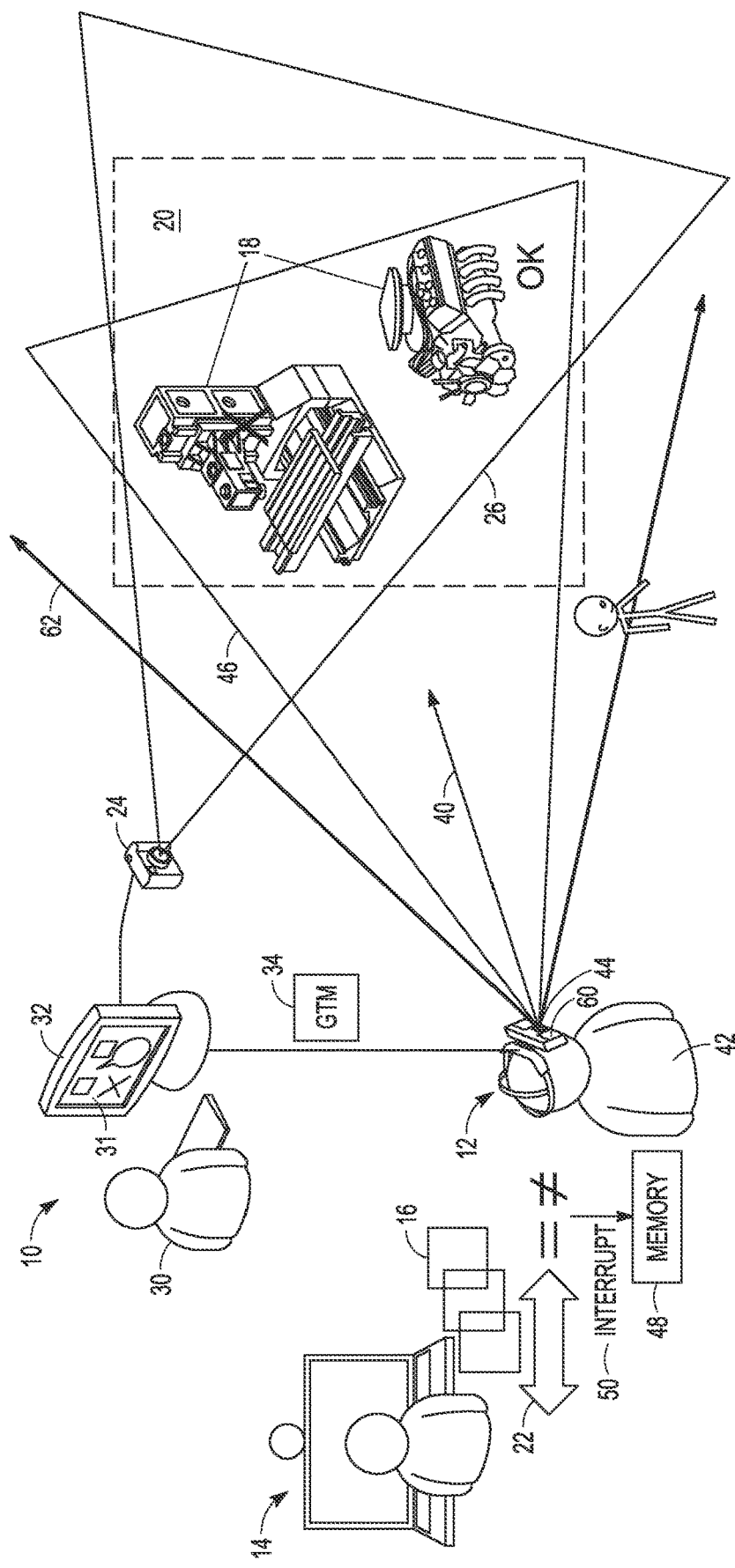
FIG. 1 is an illustration of a system in which a ground truth map (GTM) including allowed and disallowed objects is used to enforce data capture and transmission compliance of real and near real time video.
Figure 2A:
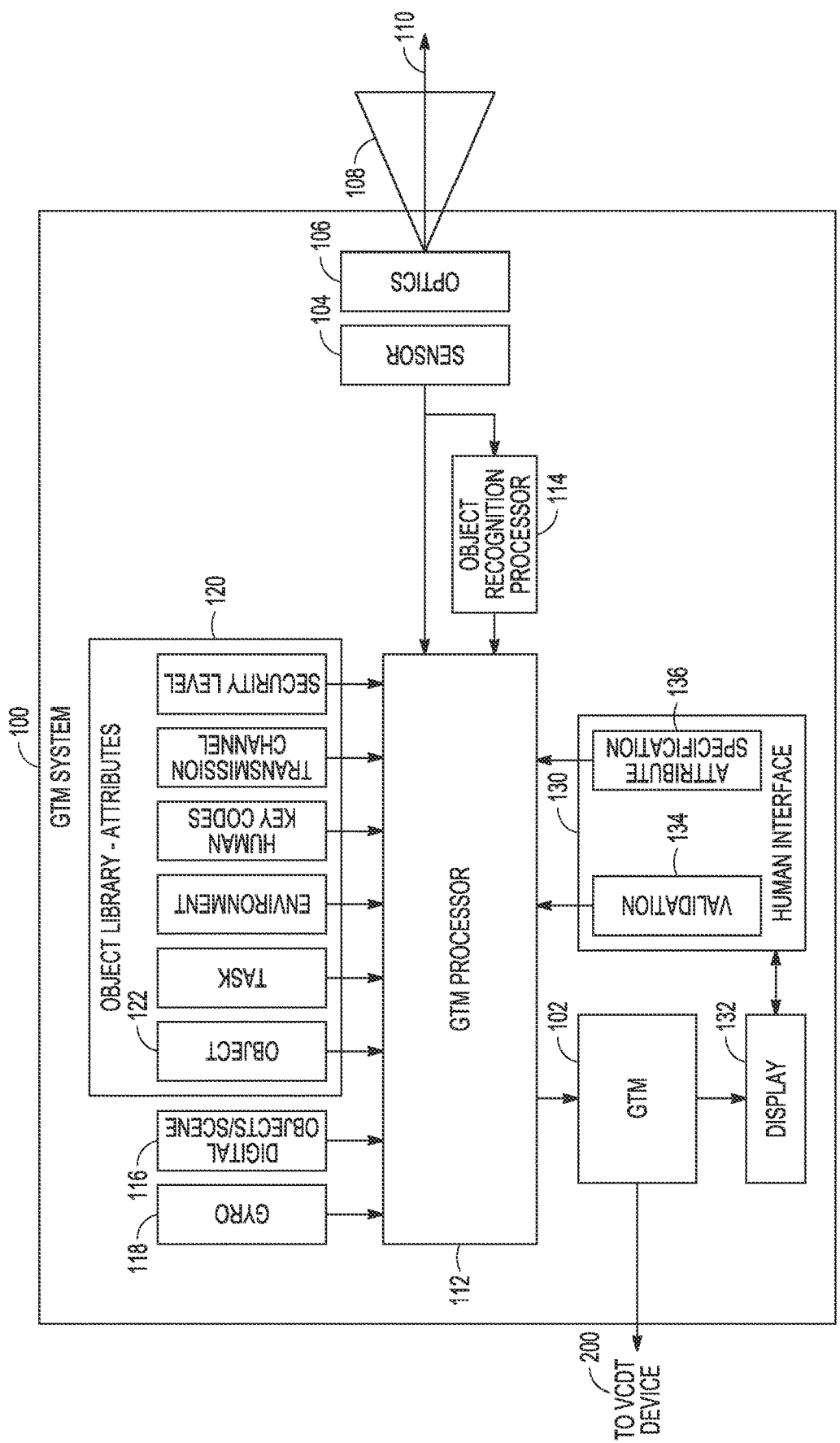
FIGS. 2A-2B are a block diagram of an embodiment of a GTM system and a video capture, display and transmission (VCDT) device to enforce data capture and transmission compliance of real and near real time video.
Figure 2B:
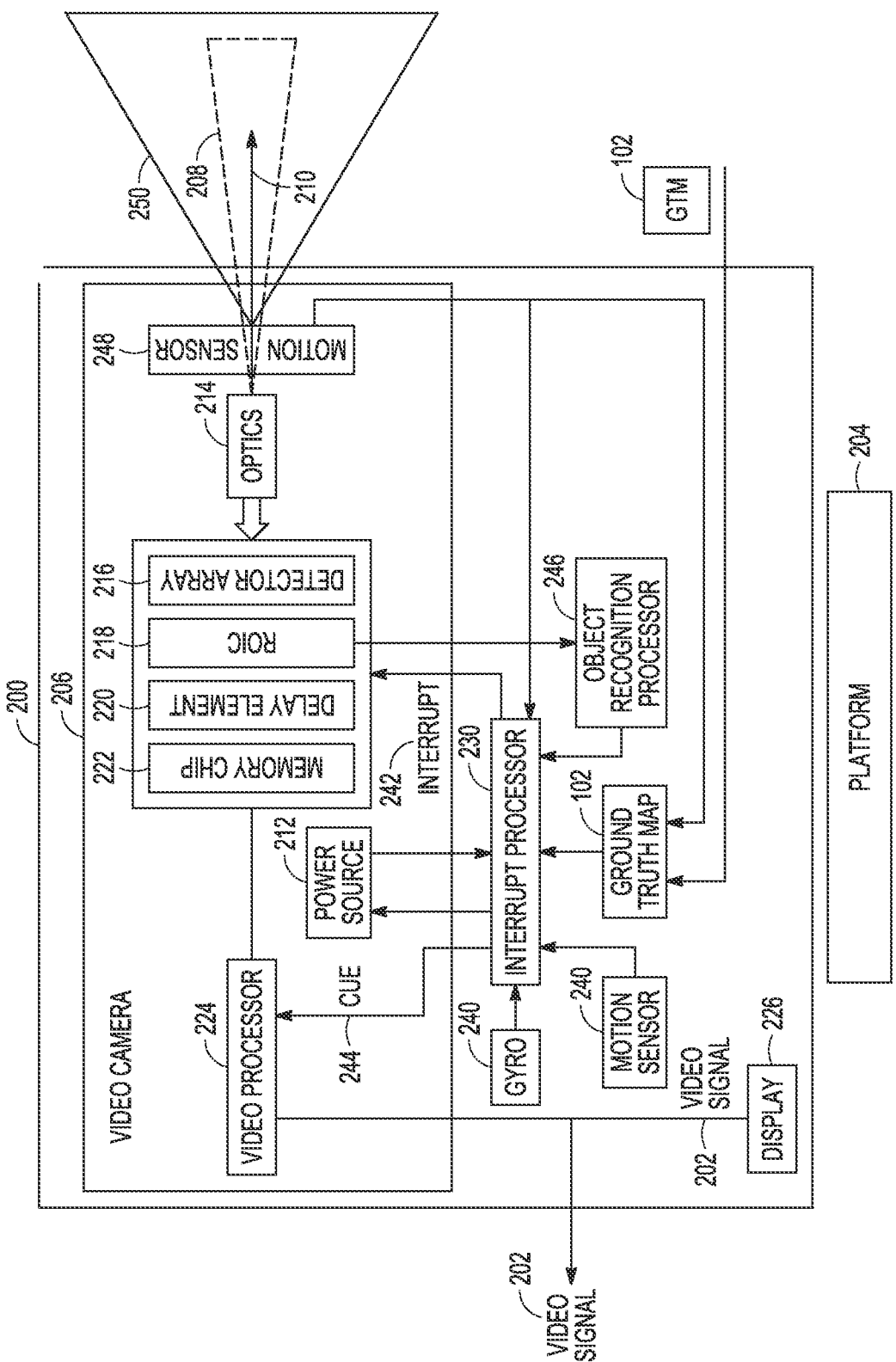

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information in real or near real time to facilitate efficient and effective communication. As a special case, data capture and transmission compliance may be implemented in an Augmented Reality (AR) environment. The video camera pointing direction is slaved or controlled by user motion (e.g. a head mounted video camera or hand-held video camera), a user-controlled manual manipulator (e.g. a robotic arm) or a fully automated manual manipulator (e.g. an AI controlled robotic arm or semi-autonomous or autonomous robot).

The present invention is directed to these and other similar application in which some level of data capture and transmission compliance may be required by customer demands, industry regulations, national security or country specific laws. In certain instances, compliance may require that portions of a scene or specifically tagged objects cannot be included within the video signal output by the video camera for display or transmission. In other more rigorous environments, compliance may require that portions of the scene or tagged objects cannot be stored in the camera's memory chip, much less output into the video signal. The memory chip may be only a memory chip or may be a video display or video transmission chip that includes the permanent memory. The required level of compliance may be determined by a number of different factors and may change between or even during capture and display or transmission of the video signal.

The present invention provides a hybrid computer/human method for generating, validating and using a ground truth map (GTM) for a video session of a local scene to provide for enforcement of data capture and transmission compliance of real and near real time video. Computer-implemented processes are used to identify and classify as allowed or disallowed objects in the local scene based on attributes of the video session. A human interface is available to validate either the object identification or classification. The GTM is then used to enforce data capture and transmission compliance of video within the local scene. This can be accomplished by computing a map FOV in the final GTM and enforcing an alignment condition to a specified allowed object, implementing an internal time-delay prior to formation of the video signal, predicting the map FOV or a combination thereof.

Using the pose and motion of the video camera, cues can be derived from the final GTM and used to prompt a correction in the video camera pointing direction to prevent capture of a disallowed object before it occurs or to enforce the alignment condition before it is lost. If the cues fail to cause corrective action, the video camera is then controlled to prevent capture of the disallowed objects or to punish loss of the alignment condition. As a result, disallowed objects do not make it into the video signal and thus do not reach downstream circuitry, processing or a network to which the video camera may be connected. This can be implemented in real or near real time or slower if the application does not demand such performance with a delay line or temporary memory chip positioned between the video camera's ROIC and memory chip. For example, the slowest acceptable video frame rate for most users is approximately 24 frames/sec (fps), or approximately 42 milliseconds (ms). A time-delay of less than 42 ms would be a generally acceptable to most users. A fast video camera is 120 fps or about 8 ms., which represents a refresh rate approximately 5 times faster than acceptable human video viewing. At these frame rates, a delay of a single frame is certainly real time. The predicted FOV can be utilized to enforce data capture and transmission compliance for a single image or a sequence of images in the video signal.

Without loss of generality, the invention will now be described in the context of an AR system in which a technician with a wearable AR device is performing some task on an object within a local scene. Video of the object and local scene is captured and transmitted to a remote client who views the video and may provide guidance, instructions, data etc. back to the technician which are then overlaid on the video. It is understood that the invention can be used in any application in which video is captured and transmitted to enforce compliance.

Referring now to FIG. 1, in an embodiment an AR environment includes a Ground Truth Map (GTM) system 10, a video capture, display and transmission (VCDT) device 12 and a remote client 14 (e.g. a person at a computer workstation with a camera) that enforce capture and transmission compliant of real-time and near real-time video 16 of objects 18 in a local scene 20 over a transmission channel 22 to remote client 14. As depicted, the GTM system 10 and VDCT device 12 are separate systems. In other embodiments, the GTM system 10 can be incorporated into the VDCT device 12, which may use a common video camera or dedicated cameras/sensors.

GTM system 10 includes a sensor 24 (e.g. a video camera, a 3D camera, LIDAR, Sonar) configured to capture a sensed signal in a sensor FOV 26, which can be scanned, manually or automatically, to form an image of the local scene 20 that provides an initial GTM. A technician 30 uses an interactive human interface 31 on a computer 32 to provide log-in credentials and other attributes of a video session. A computer-implemented object recognition algorithm processes the image to identify the objects 18 as for example milling machine #1234 and engine #4321, which become part of the GTM 28. Computer-generated models may be linked to the objects as part of the GTM. The models may include or be linked to specific attributes. A computer-implemented object classification algorithm processes the objects and the attributes of the video session to classify each object as allowed "OK" or disallowed "X" to form an intermediate GTM.

What constitutes allowed or disallowed objects may depend on many different attributes, which may be broken into attribute classes such as related to the object, task being performed during a video session, environmental, human, transmission channel, motion and security level. An object class may have specific attributes for the object identification, different classes to which the object might belong, different systems for which the object might be part of, different sub-systems that might be part of the object, object shape, object size, material composition and so forth. The task class may specify a pre-defined task such as inspection, repair, maintenance, replacement etc. or may be a description of the task. Task may also include a distance attribute whereby any object that is identified as having a distance from the video camera that is either too close (<min distance) or too far (>max distance) may be designated as disallowed. The environmental class may include the country and specific site in which the local scene exists and the video is captured or the country and specific site to which the video is transmitted. The human class may include functions or authorization levels of the technicians that capture the video and perform the task, a supervisor with override authority or the remote client. The transmission channel class may include the one or more communication channels or networks through which the video must pass to reach the remote client. The motion class may have attributes that the rate of motion (e.g., velocity and acceleration) of the video camera or an object that enters the local scene may be defined as an object and disallowed if the rate of motion exceeds a maximum value. Depending upon the nature of the application there can be many different specific attributes in each of these enumerated classes as well as other types of attribute classes.

The attributes are suitably stored in a library of objects. The specific instances of the attributes are defined at least in part through the interactive human interface via the initial log-in or specified attributes for a given session. Other attributes may be provided through other means such as the computer-generated models linked to specific objects, auto-detection of the country of origin and site, etc.. For example, for a given video session a technician may provide his log-in key codes that define his authorization/access levels, specify a particular task to be performed on a specified object, specify the country and specific site of origin and the country and specific site of destination, a remote client key code, and an overall security level. The computer-implemented classification process maps these instances of the attributes against the library to initially determine whether each object in the local scene is allowed or disallowed.

This classification process can be performed in various ways. In one approach, the library is a multi-dimensional database in which each attribute is associated with a dimension of the database. The database stores either an allowed or disallowed value for the various permutations of the attributes. The classification algorithm simply identifies the corresponding value in the database. In another approach, each attribute is treated independently and is stored as allowed or disallowed. The classification algorithm may simply take the union of the attributes and if any are disallowed then the object is disallowed. Alternately, the algorithm could give precedence to certain attributes to overrule other attributes or look for patterns within the attributes. In a different approach, the attributes are stored as descriptors of some type in which the classification algorithm implements artificial intelligence (AI) to process the different combinations or permutations of the attributes to decide whether an object is allowed or disallowed.

The interactive human interface displays the intermediate GTM and indicia of allowed and disallowed objects on computer 32 and prompts technician 30 to confirm or override the objects identifications or the allowed and disallowed object classifications to output a final GTM 34. In many applications, regardless of the sophistication or maturity of the computer-implemented processes to first identify and then classify the objects as allowed or disallowed, it is still assumed that the judgement of the human technician (or supervisor) is superior to and more trusted than that of the computer. In many of these applications, the GTM cannot be released until the human technician has validated (or corrected) the GTM. The final GTM 34 is passed to the VCDT device 12 via a hard connection (e.g,. cable) or a soft connection (e.g., wireless). A hardware of software firewall may be provided inside the VCDT device 12 to ensure that neither the GTM, imagery of or data relating to disallowed objects gets transmitted.

The VCDT device 12 such as a pair of video goggles or a hand-held unit (e.g. a tablet or cell phone) has a pointing direction 40 that is slaved to technician motion (e.g., where a technician 42 is looking or pointing the unit). VCDT device 12 includes a video camera 44 (e.g. a 2D or 3D CMOS, CCD or SWIR camera) configured to capture light within a camera FOV (CFOV) 46 about pointing direction 40 to form the video signal 16 of a portion of local scene 20. If the GTM system is integrated as part of the VCDT device 12, vocal commands or hand gestures could be used to interact with the interface to provide attributes of the video session and to confirm or override object identifications or classifications.

In this example, field technician 42, which may or may not be the same person as technician 30, may be moving around inside a manufacturing facility to confirm the existence and location of certain objects, repair or maintain certain objects or to use certain objects. These objects may be considered to be "allowed" objects. The technician may even be prompted or cued to maintain the pointing direction 40 on a specified object to perform a certain task (e.g., verification, repair, use). The field technician 42 can capture, display and transmit "allowed" objects. The field technician 42 cannot capture in memory 48, much less display or transmit, "disallowed" objects.

The VCTD device 12 cannot be activated to capture and transmit the video signal 16 until a current and final GTM 34 for the video session is received from GTM system 10 and verified by the VCDT device via, for example, a time stamp and session code. In other words, a technician cannot just turn the VCTD device 12 to start taking and transmitting the video signal. The GTM system and VCTD device force a video session to be defined (e.g., the attributes) and the computer and technician to generate and validate the final GTM and send the final GTM to the VCTD. The set-up time for this process does cause a "pause" between the initial definition of the video session and initiating the video session to capture and transmit compliant video in real or near real time.

Prior to forming the video signal 16, the VCDT device 12 uses the final GTM 34 to determine whether CFOV 46 will include disallowed or allowed objects. If a disallowed object will be included or an alignment condition to an allowed object is not satisfied, the video camera 44 is controlled (e.g., turned off, CFOV narrowed, pixels blurred pre-capture) to prevent inclusion of the disallowed object in video signal 16 or to enforce the alignment condition. If not, the video signal 16 is formed and transmitted over transmission channel 22 to the remote client 14. To make this determination, the VCDT device 12 measures a pose (location and orientation) of the video camera, uses the pose to extract a map FOV from the final GTM 34 and determines whether a disallowed object is included in the map FOV to exclude disallowed objects or determines a line-of-sight (LOS) to a specified allowed object in the map FOV to enforce an alignment condition. Furthermore, the VCDT device can compare recognized objects in the CFOV 46 to the ground truth map 34 to verify whether it's the same object, allowed or disallowed and the location, which greatly improves the accuracy and confidence of the object recognition.

To prevent the capture and transmission of excluded data, various techniques including alignment condition, time-delay, predicted FOV or a combination thereof can be used to determine the presence of allowed or disallowed objects in the map FOV in a timely manner as will be described with the presentation of FIGS. 7, 8 and 9, respectively.

Generally speaking, if a disallowed object is detected in the map FOV or an alignment condition to a specified allowed object in the map FOV is not satisfied, the VCDT device 12 issues an interrupt 50 to control the video camera 44 to interrupt and stop images from being transferred into a memory chip 48 where the video signal is formed. For example, if the pointing direction 40 satisfies an alignment condition (e.g., pointing direction within a few degrees of a preferred line-of-sight (LOS)) to allowed object 18 to perform some task and do not include any disallowed objects 18, the images captured by the video camera are transferred to memory chip 48 where they are formed into the video signal that may be displayed to the field technician or transmitted to the remote client 14 (e.g. storage or display to other remote users).

If both conditions are satisfied, the device may generate a positive cue (e.g. green "good") to reinforce the technician's focus on the allowed object. If the technician's pointing direction starts to wander away from an allowed object or towards a disallowed object but has not yet violated either condition, the device may generate a prompt cue (e.g. yellow "move left") to take corrective action. If the technician's pointing direction has changed to the point that either the alignment condition is violated or capture of a disallowed object is imminent, the device may both control the video camera to prevent capture of disallowed objects and their inclusion in the video signal or deactivate the camera and issue an interrupt cue (e.g. red "Deactivate Video Camera").

If either condition is violated, the device issues an "interrupt" 50 that controls the camera to prevent capture of the video signal including disallowed objects or when the alignment condition is not satisfied. For a violation of the alignment condition, the video camera is typically turned off either by interrupting power to the video camera, deactivating the electrochemical top layer of the detector array or ROIC or by pointing the video camera in a completely different direction. For a violation of capturing a disallowed object, in addition to these options, the video camera may be controlled to optically narrow the camera FOV or to selectively blur portions of the camera FOV (e.g. changing the f/#), changing lighting of the local scene to cause blinding of the sensor, or selectively turn off or blur pixels on the detector array corresponding to the disallowed object.

VCDT device 12 is suitably fitted with a motion sensor 60 that is configured to sense the motion of any object 62 before the object enters the video camera's CFOV 46 (e.g. the motion sensor FOV 66 includes and extends beyond CFOV 46). The moving object might be an identified and classified object in the final GTM or an unidentified object that has moved into the local scene. The VDCT device treats any moving object as a disallowed and controls the video camera 44 to prevent inclusion of the moving object in the video signal. In an embodiment, the video capture and transmission mode may be temporarily suspended until the computer-implemented process can identify and classify the object and the interactive human interface used to confirm or override the identification or classification before returning to the video capture and transmission mode.

The same method can be applied to a remotely user-controlled robotic arm that points the video camera or a fully autonomous robot that uses a video camera as part of its vision system. In the case of the robotic arm, "time-delay" can ensure that protected data is not captured and transmitted to remote site, where the technician is located or elsewhere. In the case of a fully autonomous robot, "time-delay" can ensure that protected data is not captured and used by the robot or transmitted elsewhere.

The method can be applied to applications and local scenes in which only allowed objects are present (e.g., enforcing an alignment condition to a specified allowed object) or only disallowed objects are present (e.g., preventing capture and transmission of a disallowed object).

Referring now to FIGS. 2A-2B, 3 and 4, in an embodiment similar to the one depicted in FIG. 1, a GTM system 100 generates and validates a final GTM 102 of a local scene for a particular video session and pass the final GTM 102 to a video capture, display and transmission (VCDT) device 200 that uses the final GTM 102 to enforce data capture and transmission compliance on a real or near real-time video signal 202 in the local scene.

GTM system 100 includes a sensor 104 such as a 2D camera, a 3D camera, LIDAR or sonar and optics 106 that capture a sensed signal within a sensor FOV (SFOV) 108 along a pointing direction 110 and pass the sensed signal to a GTM processor 112 to form a two or three-dimensional GTM 102. An object recognition processor 114 processes the sensed signals to identify objects in GTM 102. The objects may be linked to computer-generated models of the objects provided by digital objects/scene 116, which may also be used to provide a digital version of the captured imagery or a partial digital scene to fill in gaps in the sensed signals. An optional gyro 118 provides the GTM processor with positional and orientation data to form the GTM 102 and position objects within the GTM.

Figure 3:
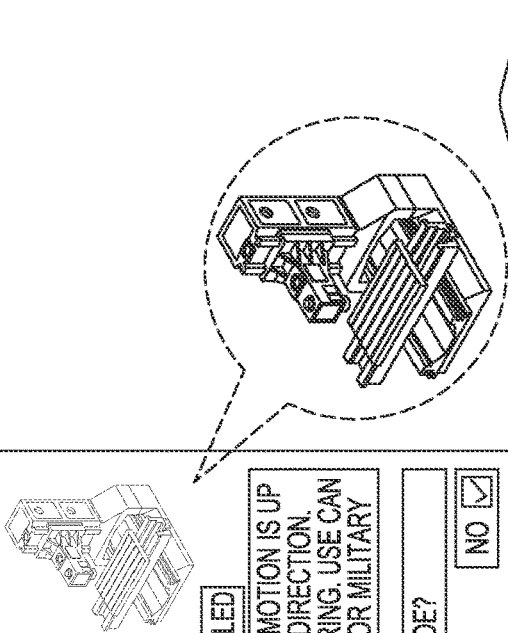
FIG. 3 is a screen shot of an embodiment of an attributes library.
Figure 4:
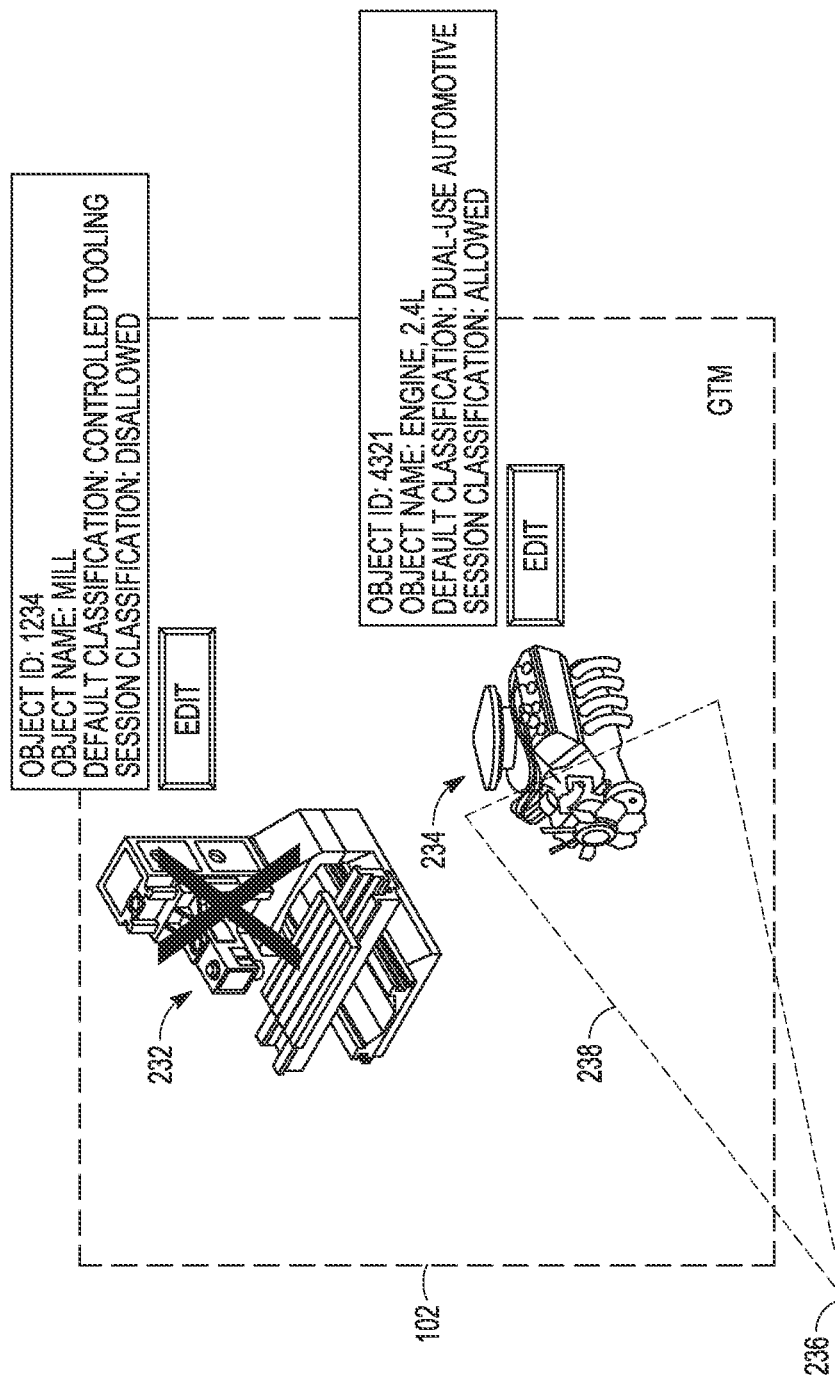
FIG. 4 is an illustration of a map FOV based on the video camera's pose overlaid on the final GTM.

An object library 120 includes attributes for a data base of known objects that together determine whether an object is allowed or disallowed for a given video session as defined by particular instances of a subset of those attributes. As previously described, the library may include object classes 122 possibly including but not limited to the object itself, task, environment, human key codes, transmit channel and security level. As shown in FIG. 3, an object class 120 may have several attributes.

An interactive human interface 130 is presented to the technician on a display 132. Interface 130 is configured to prompt and receive from a technician a validation 134 (confirmation or override) of the identification of each object. Interface 130 is configured to prompt and receive from a technician attribute specification 136 to define a particular video session (this may be done before or after validation of the object IDs). GTM processor 112 executes a classification algorithm to map the specified attributes against the library of attributes to classify each object as allowed or disallowed to form an intermediate GTM. Interface 130 then prompts the technician to validate 134 (confirm or override) the classifications of each object (the validation of the IDs and classifications may be done concurrently) to output final GTM 102.

In certain configurations, the human interface 130 may provide the technician (or supervisor) with the ability to adjust or "throttle" the classification thresholds for object identification or classification. For example, if the object recognition processor 114 is misidentifying too many objects, the technician may increase the threshold. Conversely, if the processor is leaving too many objects as unidentified, the technician may decrease the threshold. The classification algorithm may be biased to initially classify objects as disallowed unless the attributes clearly indicate the object is allowable. If the processor is mis-classifying too many objects as disallowed, the technician may reduce the classification threshold or bias.

VCDT device 200 is coupled to a "platform" 204 such as a user, robotic arm, robot etc. that controls the pointing direction of the device. VCDT device 200 includes a video camera 206 captures light within a camera field-of-view (CFOV) 208 in pointing direction 210 in the local scene. The video camera suitably includes a power source 212, optics 214 to collect light within the CFOV, a detector array 216 to sense and integrate light to form an image converting photons to electrons, a read out integrated circuit (ROIC) 218, which includes an amplifier and an A/D converter, to read out a sequence of images at a frame rate, a time-delay element 220 and a memory chip 222 to store the sequence of images and pass them to a video processor 224 to form the video signal 202 for a display 226 or transmission.

The VCTD device 100 cannot be activated to capture and transmit the video signal 202 until a current and final GTM 102 for the video session is received from GTM system 200 and verified by the VCDT device via, for example, a time stamp and session code. In other words, a technician cannot just turn the VCTD device 100 to start taking and transmitting the video signal. The GTM system and VCTD device force a video session to be defined (e.g., the attributes) and the computer and technician to generate and validate the final GTM and send the final GTM to the VCTD. The set-up time for this process does cause a "pause" between the initial definition of the video session and initiating the video session to capture and transmit compliant video in real or near real time.

An interrupt processor 230 controls video camera 206 to prevent disallowed objects 232 from being captured in the video signal or to enforce an alignment condition to a specified allowed object 234. Interrupt processor 230 receives the final GTM 102 and determines a pose 236 including a location and an orientation of the video camera to determine a map FOV 238. This may be done either thru use of a gyroscope 240 that measures the 6 DOF pose (e.g. x,y,z and rotation about x,y,z axes) of the video camera or by matching the image in the CFOV for the current frame against ground truth map 103. Prior to receiving and verifying the final GTM 102, the interrupt processor 230 may issue an interrupt (e.g., turn video camera 206 off) that prevents the video camera from capturing and transmitting any video.

Interrupt processor 230 determines whether the map FOV 238 includes a specified allowed object 234 or a disallowed object 232. As further illustrated in FIGS. 7, 8 and 9 the interrupt processor 230 can use alignment condition, time-delay and predicted FOV techniques or a combination thereof to determine whether the map FOV 238 includes a disallowed object 232 or whether the orientation of the video camera satisfies an alignment condition to the specified allowed object 234 sufficient to exclude the disallowed object 232 from the CFOV in a manner that prevents inclusion of disallowed objects in real or near-real time video for transmission. In the alignment condition technique, the interrupt processor enforces an alignment of the video camera orientation or pointing direction to the specified allowed object. In the time-delay technique, the captured frames are delayed by time-delay element 220 giving the interrupt processor sufficient time to process the frames to make the determination. In the predicted FOV technique, a motion sensor 240 proves measurement of velocity and acceleration, suitably in 6 DOF, that when combined with the current pose 236 provided predicted map FOV for one or more future frames from which the interrupt processor can make the determination.

If the interrupt processor 230 determines that either the map FOV, hence the video camera CFOV will include a disallowed object or does not satisfy an alignment condition, the processor issues an interrupt 242 to control the video to prevent capture of the disallowed object and its inclusion in the video signal. If an interrupt is issued, the video signal 202 may receive no video signal if power was interrupted, may receive a blank or noisy video signal if the ROIC is deactivated or may receive a video signal in which the pixels corresponding to the disallowed objected are removed or obscured.

Interrupt processor 230 may generate a cue 244 to change the video camera pointing direction to prevent capture of disallowed objects and their inclusion in the one or more future frames of the video signal without having to control or turn-off the video camera. Cue 244 is configured to preempt movement of the video camera towards the disallowed object before it occurs. For example, if the alignment condition is met a "green" cue may be displayed, if the alignment starts to wander a "yellow" cue is displayed and if the alignment fails a "red" cue is displayed. After generating the cue, the interrupt processor updates the one or more predicted FOV to determine whether the updated predicted FOV includes the disallowed object. If the cue fails to prevent capture of the disallowed object in the updated predicted FOV, then the interrupt processor 230 issues the interrupt 242 to control the video to prevent capture of the disallowed object and its inclusion in the video signal.

If the video camera is trained on allowed object 234 and away from disallowed objects 1232, the interrupt processor 240 determines whether the camera's pointing direction satisfies an alignment condition to one of the allowed objects. If not, the system generates a cue 244 to change the video camera pointing direction to enforce the alignment condition. If the cue fails to enforce the alignment condition, the video camera is deactivated. Loss of the alignment condition does not necessarily mean that the camera is going to capture a disallowed object. However, if the video camera wanders off of the allowed object and the cue fails to correct the problem, turning off the video camera, at least temporarily, is effective to train the platform to maintain the proper alignment to the allowed object to perform the task at hand. The length of time the video camera is turned off can vary in order to more effectively train the local or remote user or robot.

As image frames are generated by the ROIC 218, the frames can be passed to an object recognition processor 246 configured to recognize and identify any objects in the frame. Interrupt processor 230 compares the recognized objects in the CFOV 208 to the ground truth map 102 to verify whether it's the same object, allowed or disallowed and the location, which greatly improves the accuracy and confidence of the object recognition.

VCDT device 200 is suitably fitted with a motion sensor 248 that is configured to sense the motion of any object before the object enters the video camera's CFOV 208 (e.g. the motion sensor FOV 250 includes and extends beyond CFOV 208). The moving object might be an identified and classified object in the final GTM or an unidentified object that has moved into the local scene. The VDCT device treats any moving object as a disallowed and controls the video camera 44 to prevent inclusion of the moving object in the video signal. In an embodiment, the video capture and transmission mode may be temporarily suspended until the computer-implemented process can identify and classify the object and the interactive human interface used to confirm or override the identification or classification before returning to the video capture and transmission mode.

Figure 5A:
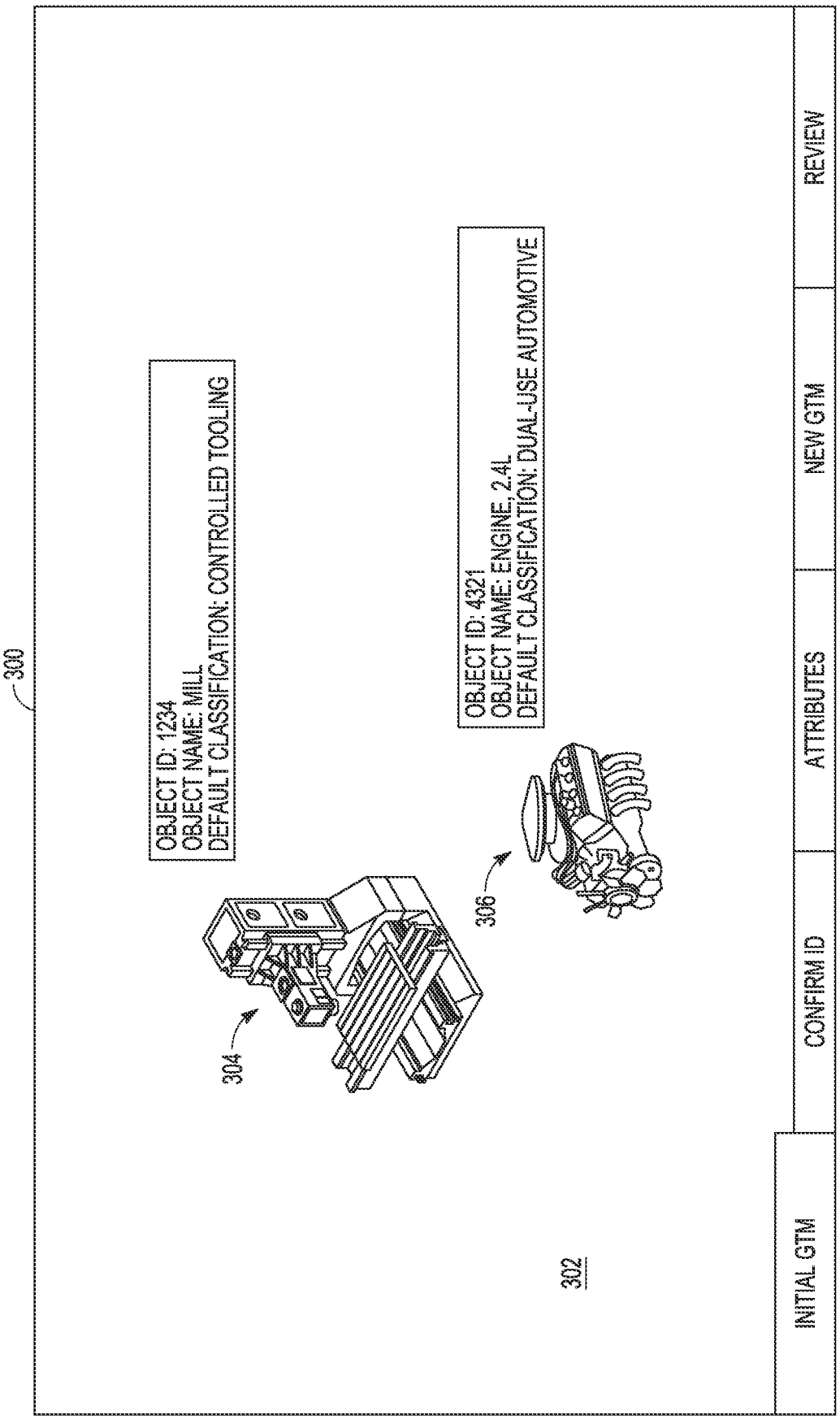
Figure 5B:
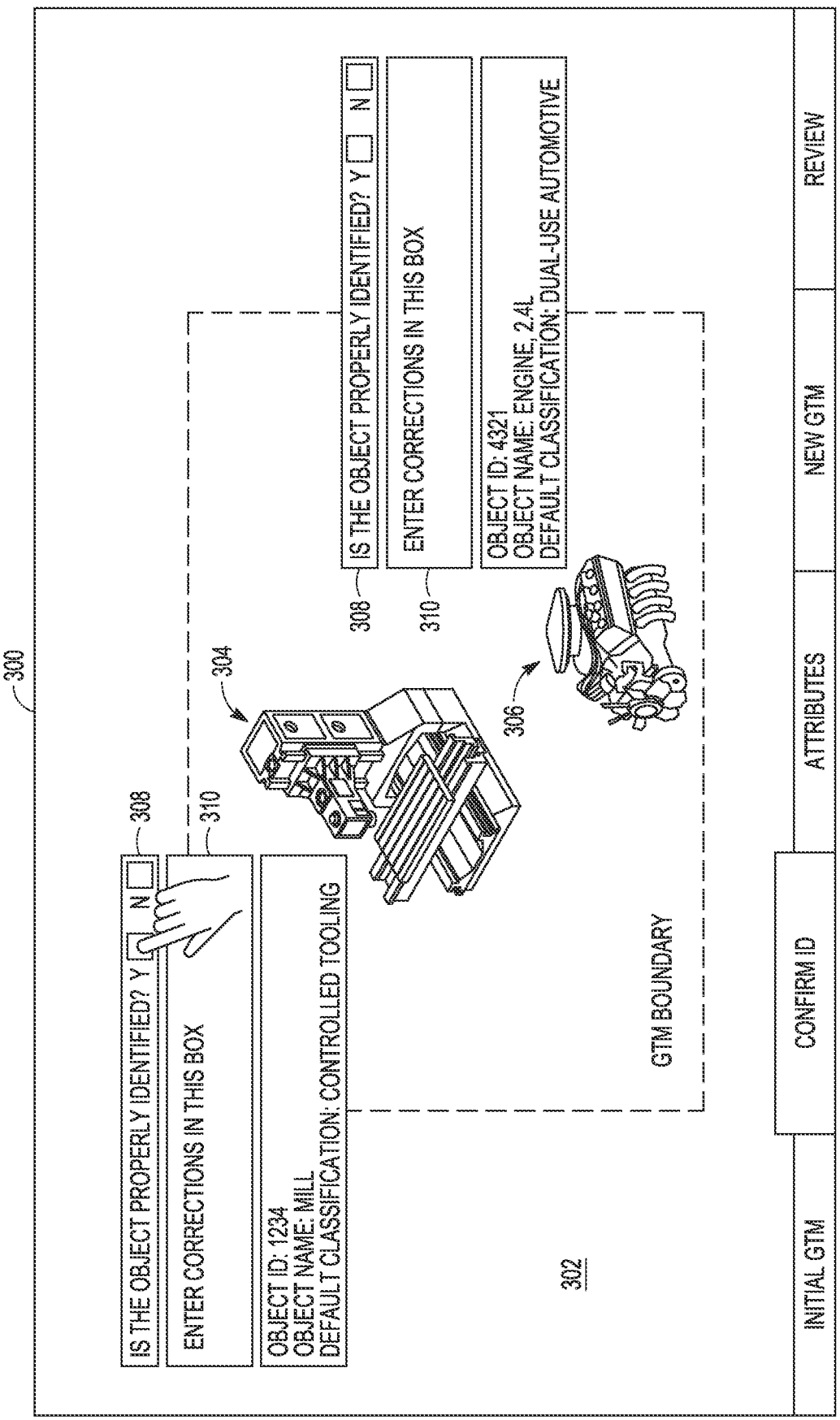
Figure 5D:
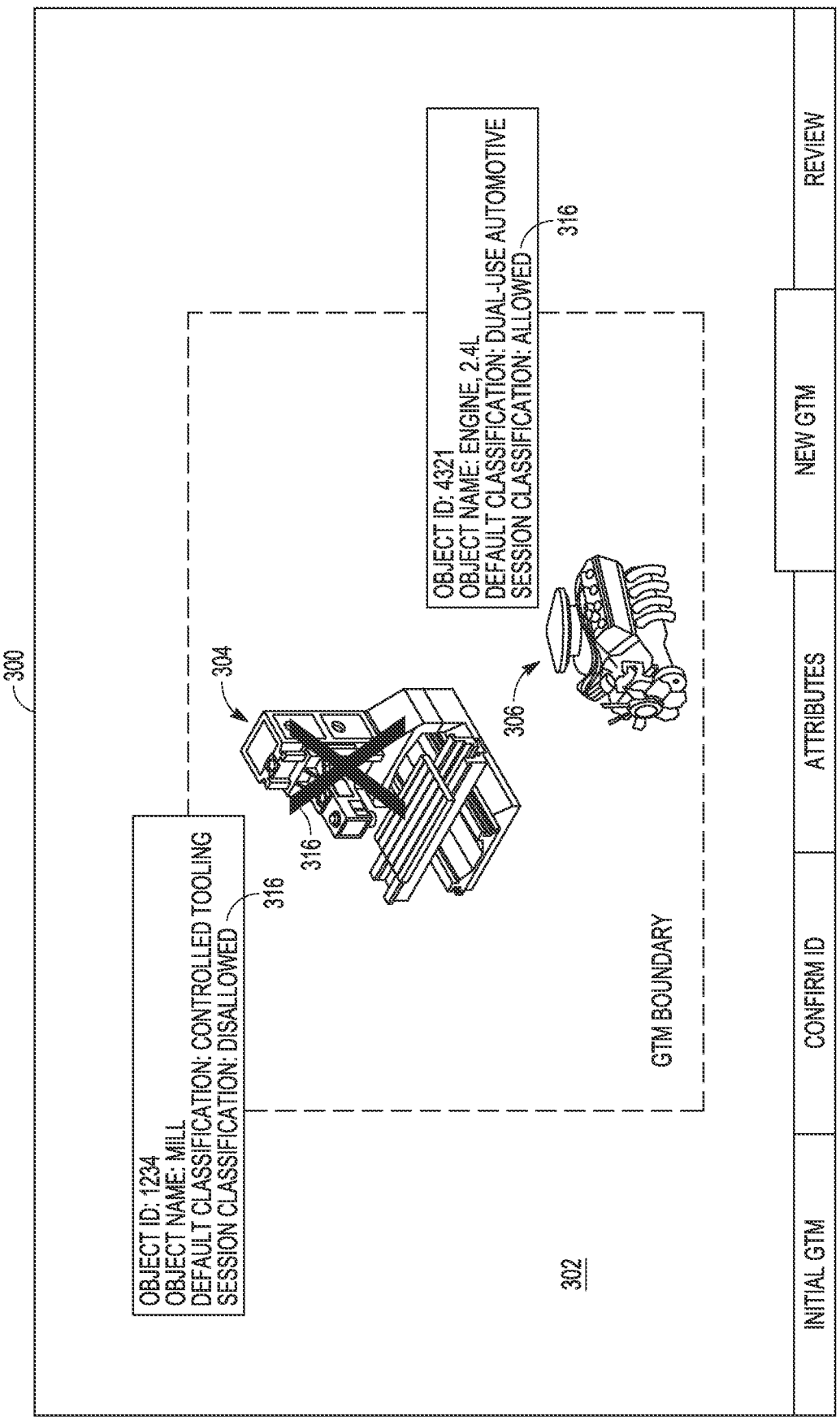
Figure 5E:
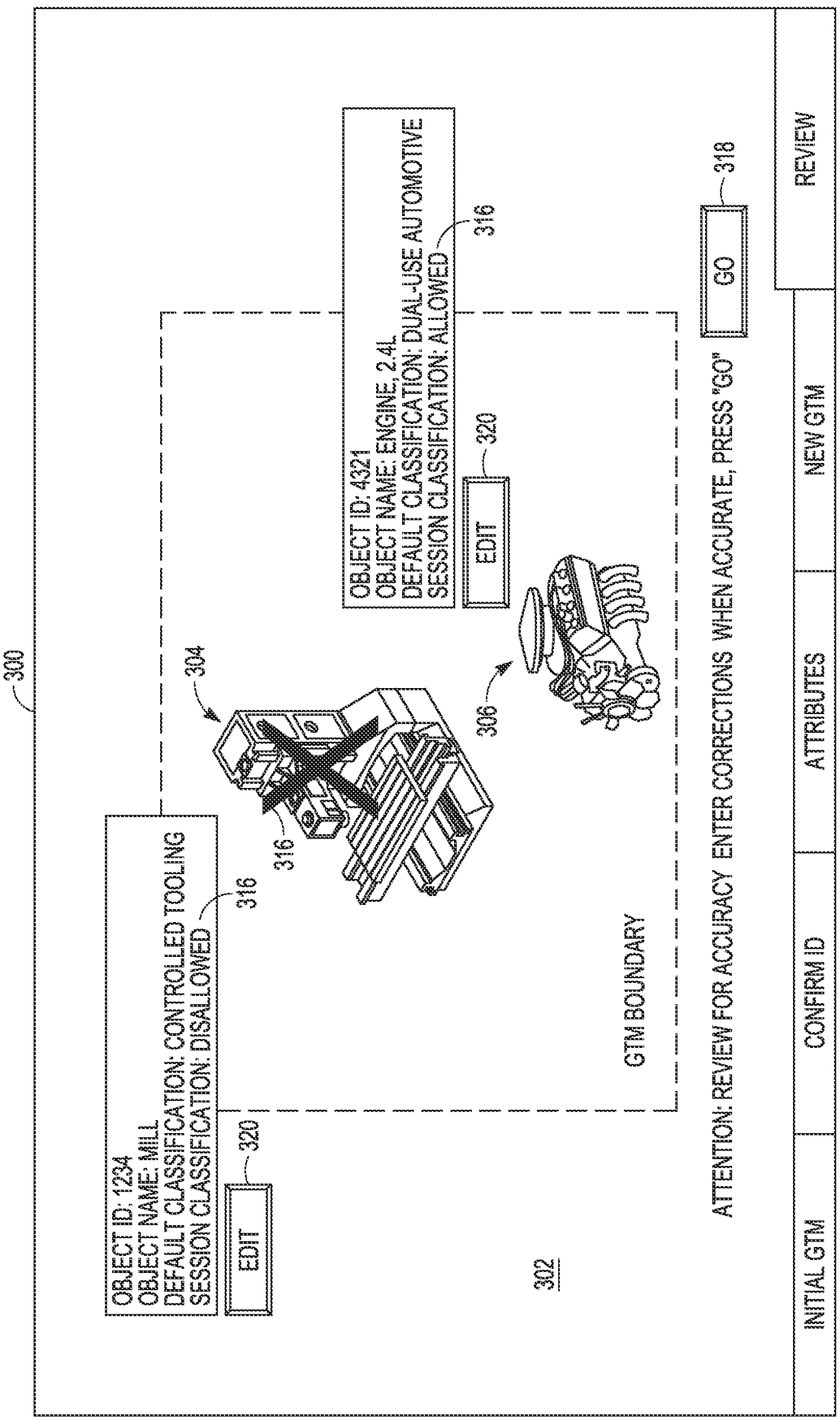

Referring now to FIGS. 5A-5E that depict a sequence of screen shots of the interactive human interface, in an embodiment for generating and validating a final GTM, as shown in FIG. 5A an initial GTM 300 suitably includes real imagery 302 of a local scene including one or more objects 304 and 306, which have been identified and suitably linked to computer-generated models of the particular object. A technician selects "Confirm ID" from the menu. As shown in FIG. 5B, the interface displays a prompt 308 to prompt the technician to confirm or override each object identification. If an override is made, the interface displays a prompt 310 to prompt the technician to enter the correct identification and any other relevant information, which can be stored in a historical record and used to modify the object databases or object recognition algorithms. Once each of the objects has been validated, the technician selects "Attributes" from the menu. As shown in FIG. 5C, the interface displays a menu 312 of attributes 314 such as object, task, environment, humans, security level etc. and prompts the technician to select or otherwise provide a specific instance for each attribute which together define (at least in part) the video session. Some of the attributes may be populated via the log-in key codes, automatic detection of the country or origin, etc. Once the specification of attributes for the video session is complete, the technician can select "New GTM" to run the computer-implemented process to match the specified attributes to the library of attributes to classify each object as allowed or disallowed and to display indicia 316 (e.g., words allowed or disallowed, a green check or a red X) as shown in FIG. 5D. To complete the GTM, the technician selects "Review" and as shown in FIG. 5E the interface prompts the technician to confirm ("Go" prompt 318) or to override ("Edit" prompt 320) each object classification. Again, if the technician overrides a classification, the technician is prompted to enter the reasons for the override, which are then stored in a historical record or used to modify the attribute library or classification algorithm. In this embodiment, the initial GTM is validated as to object identification and then available for any specific video session in which the objects are classified based on the attributes for that session.

Figure 6A:
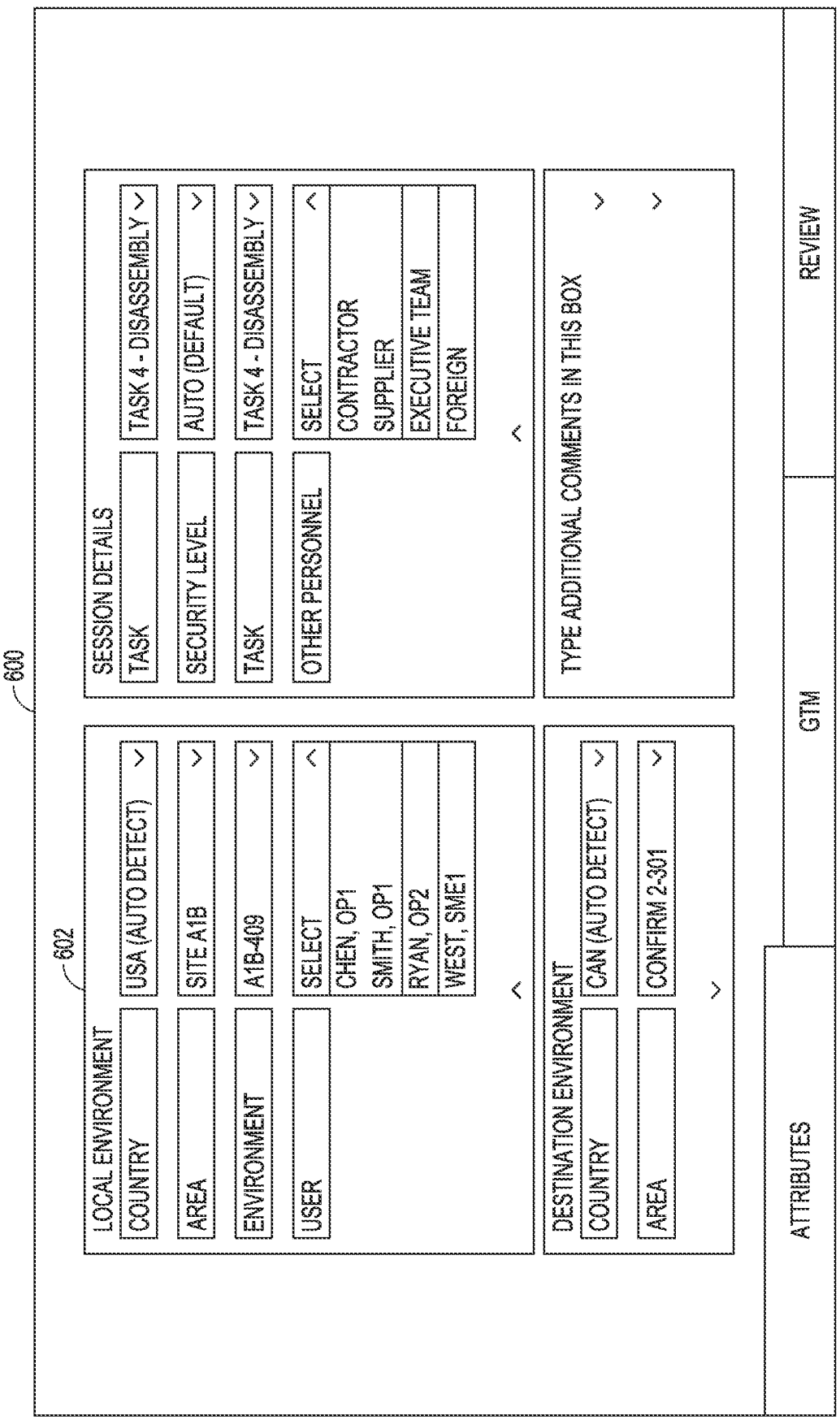
FIGS. 6A-6C are screen shots of another embodiment of an interactive human interface for generating and validating a GTM.
Figure 6B:
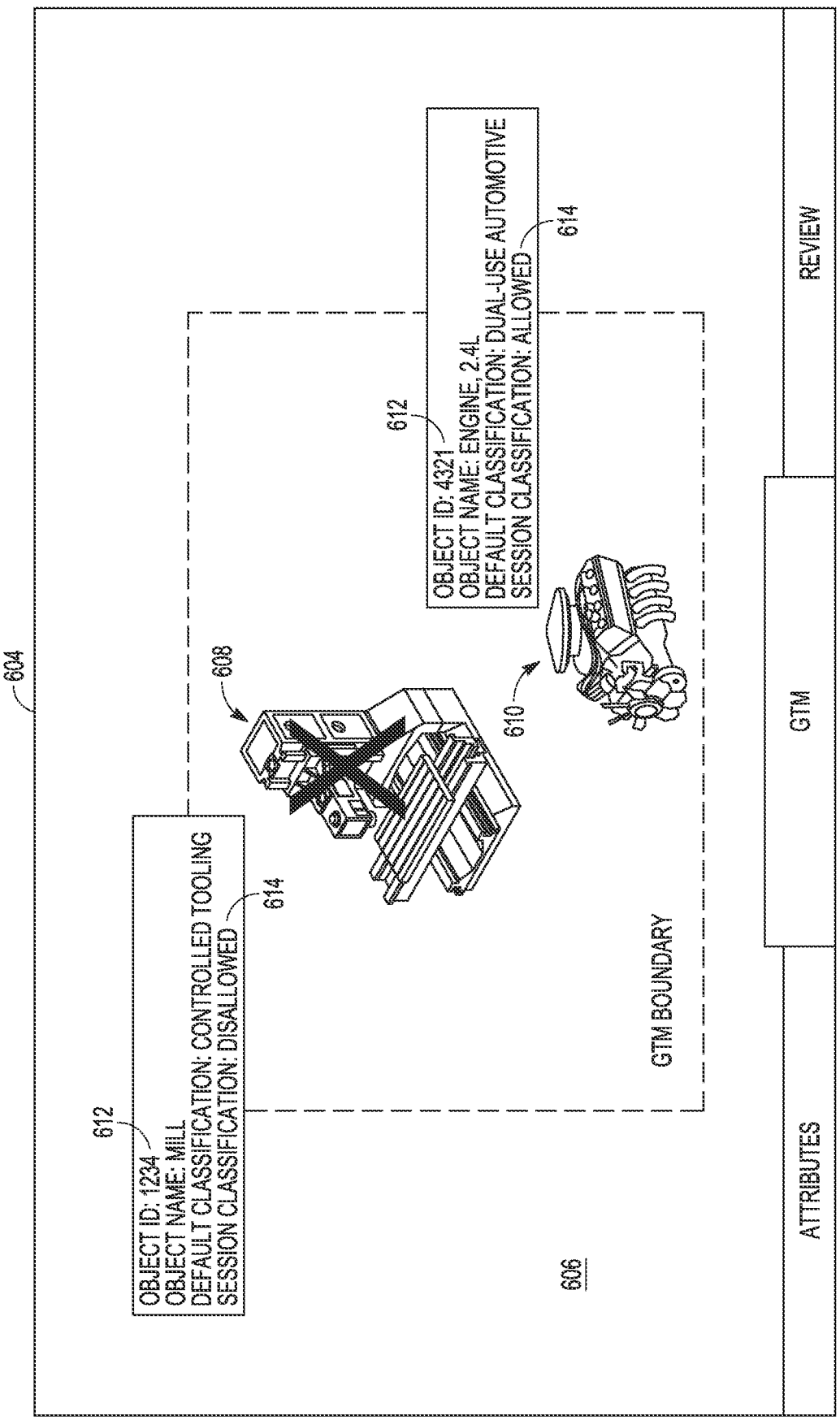
Figure 6C:
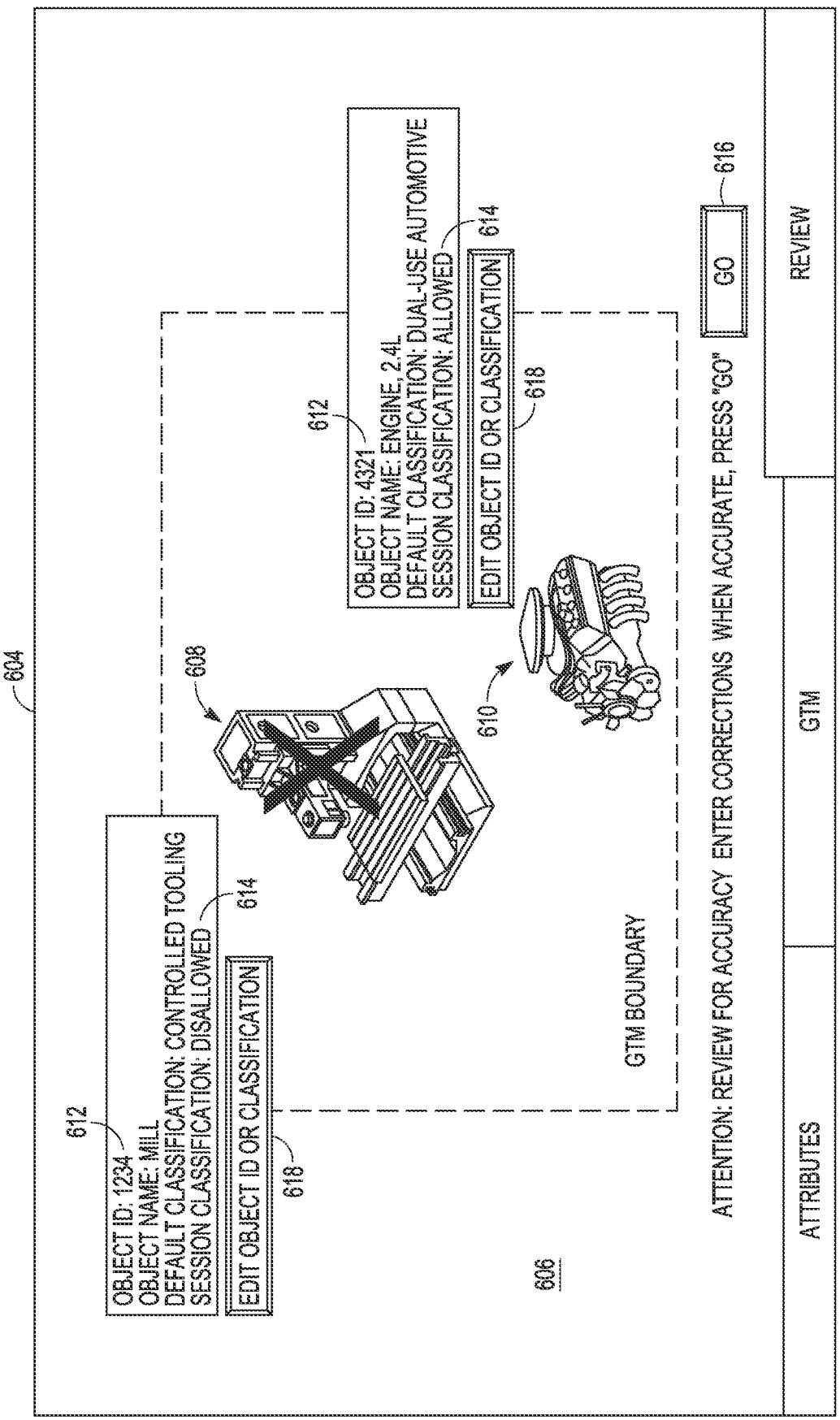

In a different embodiment, the interface is used to specify the attributes of a specific video session and then, as the camera/sensor is used to create the image of the local scene (possibly augmented with computer-models of the objects), computer-implemented processes first identify and then classify the objects as allowed or disallowed. The interactive human interface is then used to confirm or override both the object identifications and classifications. As shown in FIG. 6A, the interface first displays a menu 600 of attributes 602 for technician selection/definition to provide the attributes that define a video session. Once complete, the technician selects "GTM", the camera/sensor and computer-implemented processes generate a GTM 604 including imagery 606 of the local scene and identified and classified objects 608 and 610. Indicia 612 and 614 of the object identification and classification, respectively, are displayed as shown in FIG. 6B. To complete the GTM, the technician selects "Review" and as shown in FIG. 5E the interface prompts the technician to confirm ("Go" prompt 616) or to override ("Edit" prompt 618) each object classification. Again, if the technician overrides a classification, the technician is prompted to enter the reasons for the override, which are then stored in a historical record or used to modify the attribute library or classification algorithm.

As previously mentioned, to prevent the capture and transmission of excluded data in real or near real-time, various techniques including alignment condition, time-delay, predicted FOV or a combination thereof can be used to determine the presence of allowed or disallowed objects in the map FOV in a timely manner.

Figure 7:
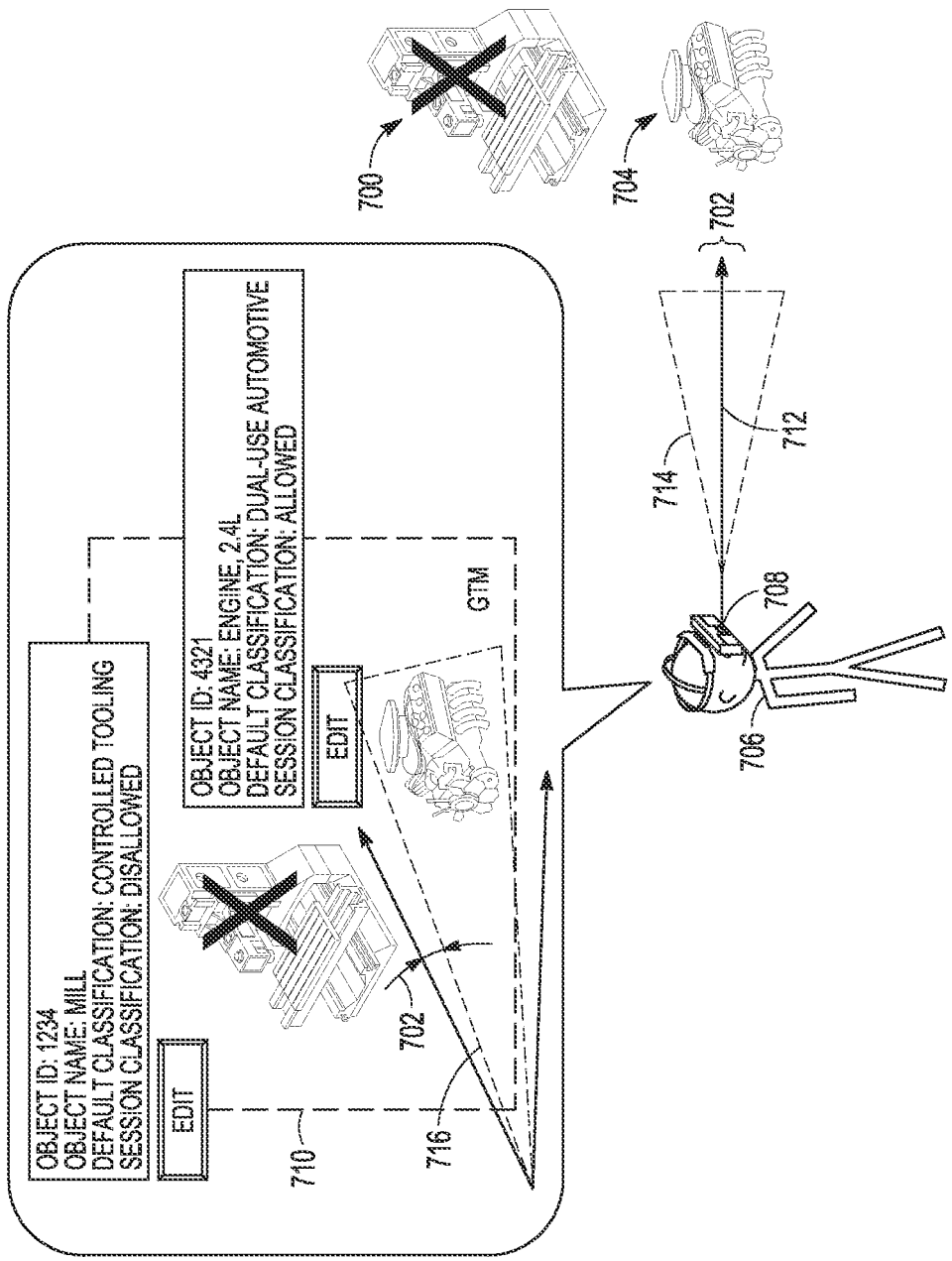
FIG. 7 is an illustration of using the GTM to enforce an alignment condition to a specified object in the scene to enforce data capture and transmission compliance.

Referring now to FIG. 7, an "Alignment Condition" technique ensures in real or near real-time that disallowed objects 700 are not included in the video stream by enforcing an alignment condition 702 to a specified allowed object 704. The alignment condition can be set to plus/minus a few degrees to ensure the technician 706 keeps his/her eyes on the specified object or the interrupt processor, knowing the location of the technician (video camera 708) can determine from the final GTM 710 how much the technician's eyes (camera pointing direction 712) can wander from a specified object before a disallowed object will appear in the camera FOV (CFOV) 714. In the latter case, the alignment condition may change as technician moves to perform a given task. The alignment condition can be enforced either by monitoring changes in the technician's pose (via the gyro) or by comparing a map FOV 716 for the current frame against final GTM 710. The interrupt process may also generate cues that are displayed (or verbalized) to the technician. If the camera pointing direction 712 is pointing directly at allowable object 704 a green "good" might be provide. If the pointing direction 712 starts to wander but is still withing the alignment condition 702 a yellow-correct right might be provided. If the pointing direction 712 violates the alignment condition 702 a red-camera deactivated might be provided and an interrupt issued to the video camera. Additional details for enforcement of alignment condition without a GTM are provided in U.S. Pat. Nos. 10,403,046 and 10,679,425.

Figure 8:
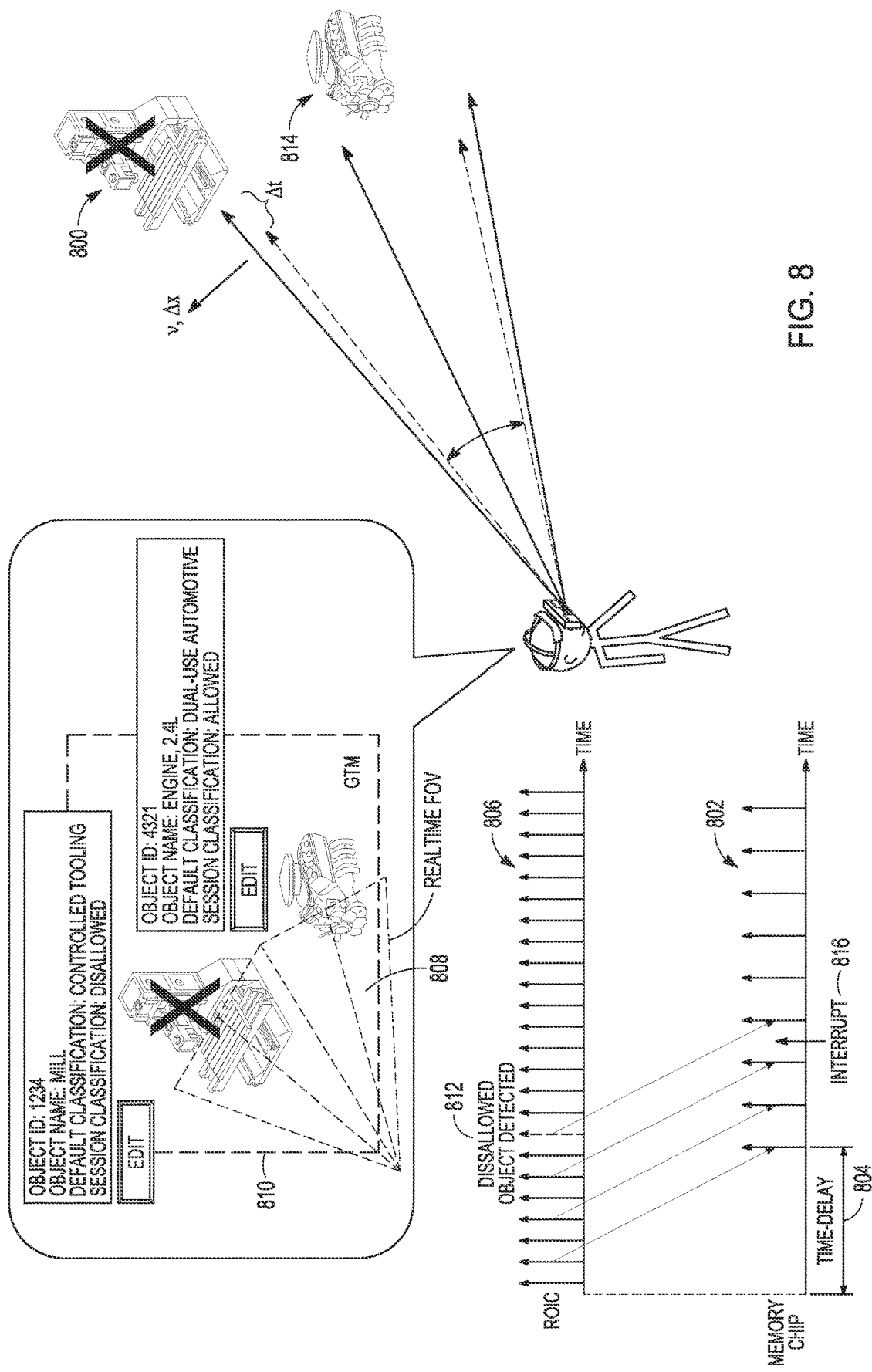
FIG. 8 is an illustration of using the GTM with time-delayed capture of the video signal to enforce data capture and transmission compliance.

Referring now to FIG. 8, a "Time-Delay" technique ensures in real or near real-time that disallowed objects 800 are not included in the video stream 802 by inserting a time-delay 804 between the sequence of images 806 read out by the ROIC and the storage of the sequence of images in the memory chip to form the video stream. The time-delay 804 must be long enough that a map FOV 808 in a final GTM 810 can be processed to detect the presence of a disallowed object 812 (or to ensure an alignment condition is met to an allowed object 814) and issue an interrupt 816 before the problematic image is included in the video stream 802 and short enough that capture and transmission of the video stream 802 is still real or near real time. In another embodiment, a second sensor having a FOV that spans the entire CFOV can be used in conjunction with the final GTM to recognize objects and issue the interrupt. The interrupt processor may generate cues for the technician. Additional details for capture and transmission compliance using time-delay are providing in co-pending U.S. application Ser. No. 17/507,073 entitled "Time-Delay to Enforce Data Capture and Transmission Compliance in Real and Near Real Time Video" filed Oct. 21, 2021.

Figure 9:
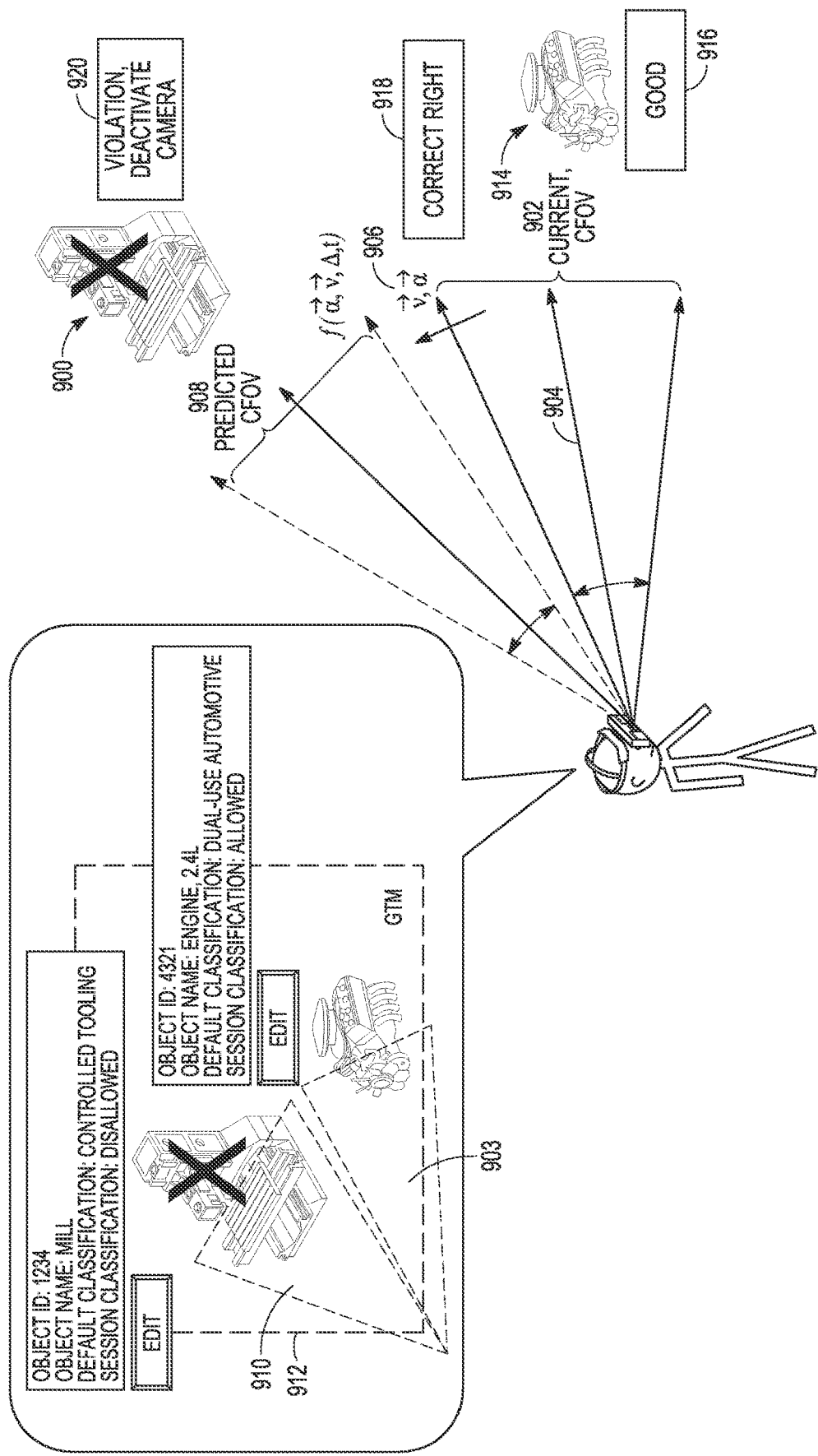
FIG. 9 is an illustration of using the GTM with a predictive FOV of the video signal to enforce data capture and transmission compliance.

Referring now to FIG. 9, a "Predictive FOV" technique ensures in real or near real-time that disallowed objects 900 are not included in the video stream by using a current CFOV 902 (map FOV 903) and camera pose 904 and measurements of camera velocity and acceleration 906 to compute predicted CFOV 908 and predicted map FOV 910 in the final GTM 912 for one or more future frames. The interrupt processor determines whether any of the future frames contain a disallowed object 900 or fail to satisfy an alignment condition to an allowed object 914. The interrupt processor may also generate cues that are displayed (or verbalized) to the technician. If the camera pointing direction is pointing directly at allowable object 914 a green "good" 916 might be provide. If the pointing direction starts to wander in the predicted CFOV 908 but is still withing the alignment condition a yellow-correct right 918 might be provided. If the pointing direction in the predicted CFOV 908 violates the alignment condition a red-deactivate camera 920 might be provided and an interrupt issued to the video camera. Additional details for capture and transmission compliance using time-delay are providing in co-pending U.S. application Ser. No. 17/507,073 entitled "Predictive Field-of-view (FOV) and Cueing to Enforce Data Capture and Transmission Compliance in Real and Near Real Time Video" filed Oct. 21, 2021.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of preventing capture and transmission of excluded data in a local scene from a video signal, said method comprising:

providing a library of objects, each object characterized by one or more attributes that determine whether an object is allowed or disallowed;

generating a ground truth map of the local scene including one or more identified objects;

using an interactive human interface to specify one or more attributes;

using a computer-implemented process to compare identified objects to the library of objects and use the specified attributes to classify the objects in the ground truth map as disallowed or allowed; and using the interactive human interface to display the ground truth map and indicia of allowed and disallowed objects and to receive human input to confirm or override the allowed and disallowed object classifications to output a final ground truth map;

in a video capture and transmission mode, using a video camera at a position in the local scene to capture a sequence of images within a camera field-of-view (CFOV) in a pointing direction in the local scene to form the video signal;

prior to forming the video signal, using the final ground truth map to determine whether the CFOV will include disallowed or allowed objects;

if a disallowed object will be included in the CFOV, controlling the video camera to prevent inclusion of the disallowed object in the video signal; and if no disallowed objects will be included in the CFOV, forming and transmitting the video signal.

2. The method of claim 1, in a object identification mode, generating the ground truth map comprises using a camera to create an image of the local scene;

using a computer-implemented process to identify objects in the image; and using the interactive human interface to display the image and indicia of the identified objects and to receive human input to confirm or override the object identifications, and then in an object validation mode, using the interactive human interface to specify the attributes, the computer-implemented process to classify the objects and then the interactive human interface to confirm or override the classifications.

3. The method of claim 1, wherein in an object identification and validation mode, using the interactive human interface to specify the attributes, as a camera is used to create an image of the local scene, using a computer-implemented process to first identify and then classify objects as allowed or disallowed; and then using the interactive human interface to display the image and indicia of the identified and classified objects and to receive human input to confirm or override both the object identifications and classifications.

4. The method of claim 1, further comprising using the interactive human interface to vary a classification threshold of either the computer-implemented process to identify objects or the computer-implemented process to classify the objects as allowed or disallowed.

5. The method of claim 1, wherein a step of generating the ground truth map comprises:

linking computer models of the objects to the identified object in the ground truth map and to the attributes in the library.

6. The method of claim 1, wherein the specified attributes include a plurality of object, environment, task, human, transmission channel and security level attributes.

7. The method of claim 6, wherein the interactive human interface displays a prompt to confirm or override each of the allowed and disallowed object classifications and requires a confirmation or override of each object classification to output the final ground truth map.

8. The method of claim 1, wherein the ability of human input to override the allowed and disallowed object classifications is defined by attributes of the operator or a superior or attributes of the classified object.

9. The method of claim 1, wherein if human input overrides an object classification, the interactive human interface displays a prompt to enter reasons for the override, further comprising:
storing the reasons for the override in a historical record; or
using the reasons for the override to modify the attributes of the object in the library or to modify the computer-implemented process to classify the objects.

10. The method of claim 1, wherein in the video capture and transmission mode, a step of using the final ground truth map to determine whether the CFOV will include disallowed or allowed objects includes
determining a pose including a location and an orientation of the video camera within the local scene;
using the pose to extract a map FOV from the final ground truth map; and
determining whether the map FOV includes disallowed or allowed objects.

11. The method of claim 10, further comprising:
comparing the imagery within the camera FOV to the map FOV to confirm whether the map FOV includes disallowed or allowed objects.

12. The method of claim 10, wherein the step of using the final ground truth map to determine whether the CFOV will include disallowed or allowed objects further comprises;
determining whether the video camera pointing direction satisfies an alignment condition to a specified allowed object in the map FOV to exclude any disallowed objects from the CFOV.

13. The method of claim 10, wherein the step of using the final ground truth map to determine whether the CFOV will include disallowed or allowed objects further comprises:
delaying the sequence of images by a time-delay prior to formation of the video signal; and
in response to recognition of a disallowed object in the map FOV and prior to expiration of the time-delay, controlling the video camera to prevent storage of images including the disallowed object and its inclusion in the video signal.

14. The method of claim 10, wherein a step of using the final ground truth map to determine whether the CFOV will include disallowed or allowed objects further comprises;
receiving measurements of velocity and acceleration of the video camera's pointing direction;
computing one or more predicted map FOV for one or more future frames from the pose and the measurements of velocity and acceleration; and
comparing the one or more predicted map FOV to the final ground truth map to recognize and locate disallowed objects.

15. The method of claim 10,
generating a cue to change the video camera pointing direction to prevent capture of disallowed objects and their inclusion in the one or more future frames of the video signal;
after generating the cue, updating the map FOV to determine whether the updated map FOV includes the disallowed object; and
if the cue fails to prevent capture of the disallowed object in the updated predicted map FOV, then controlling the video camera to prevent capture of the disallowed object and its inclusion in the video signal.

16. The method of claim 1, wherein in the video capture and transmission mode, further comprising:
sensing motion of any object before the object enters the video camera's CFOV and treating any moving object as a disallowed object such that the video camera is controlled to prevent inclusion of the moving object in the video signal.

17. The method of claim 16, if a moving object is sensed,
temporarily suspending the video capture and transmission mode;
using the computer-implemented process to identify and classify the moving object as allowed or disallowed;
using the interactive human interface to display the ground truth map and indicia of the classification of the moving object to confirm or override the classification; and
returning to the video capture and transmission mode.

18. A method of preventing capture and transmission of excluded data in a local scene from a video signal, said method comprising:
providing a library of objects, each object characterized by one or more attributes that determine whether an object is allowed or disallowed;
generating a ground truth map of the local scene including one or more identified objects; and
using a computer-implemented process to compare identified objects to the library of objects and use attributes specified for a particular session to classify the objects in a final ground truth map as disallowed or allowed;
in a video capture and transmission mode,
using a video camera at a position in the local scene to capture a sequence of images within a camera field-of-view (CFOV) in a pointing direction in the local scene to form the video signal;
prior to forming the video signal, using the final ground truth map to determine whether the CFOV will include disallowed or allowed objects;
if a disallowed object will be included in the CFOV, controlling the video camera to prevent inclusion of the disallowed object in the video signal; and
if no disallowed objects will be included in the CFOV, forming and transmitting the video signal.

19. The method of claim 18, wherein the step of generating the ground truth map comprises:
using a camera to create an image of the local scene;
using a computer-implemented process to identify objects in the image; and
using the interactive human interface to display the image and indicia of the identified objects and to receive human input to confirm or override the object identifications.

20. The method of claim 18, wherein the step of generating the ground truth map comprises:
linking computer models of the objects to the identified object in the ground truth map and to the attributes in the library.

21. The method of claim 18, wherein in the video capture and transmission mode, further comprising:
sensing motion of any object before the object enters the video camera's CFOV and treating any moving object as a disallowed object such that the video camera is controlled to prevent inclusion of the moving object in the video signal.

22. A method of preventing capture and transmission of excluded data in a local scene from a video signal, said method comprising:
generating a ground truth map of the local scene including one or more identified objects; and
classifying the objects in the ground truth map as disallowed or allowed;
in a video capture and transmission mode,
using a video camera at a position in the local scene to capture a sequence of images within a camera field-of-view (CFOV) in a pointing direction in the local scene to form the video signal;
prior to forming the video signal, using the ground truth map to determine whether the CFOV will include a disallowed object;
if a disallowed object will be included in the CFOV, controlling the video camera to prevent inclusion of the disallowed object in the video signal; and
if no disallowed objects will be included in the CFOV, forming and transmitting the video signal.

23. The method of claim 22, wherein in the video capture and transmission mode, further comprising:
sensing motion of any object before the object enters the video camera's CFOV and treating any moving object as a disallowed object such that the video camera is controlled to prevent inclusion of the moving object in the video signal.

* * * * *

UNITED STATES PATENT AND TRADEMARK OFFICE
CERTIFICATE OF CORRECTION

PATENT NO. : 11,700,448 B1
APPLICATION NO. : 17/733456
DATED : July 11, 2023
INVENTOR(S) : Cogliandro et al.

Page 1 of 1

It is certified that error appears in the above-identified patent and that said Letters Patent is hereby corrected as shown below:

In the Specification

In Column 3, Line 8, delete "alignement" and insert --alignment-- therefor

In Column 13, Line 2, delete "1232," and insert --232,-- therefor

In Column 13, Line 3, delete "240" and insert --230-- therefor

Signed and Sealed this
First Day of October, 2024

Katherine Kelly Vidal
*Director of the United States Patent and Trademark Office*